United States Patent
Liu et al.

(10) Patent No.: US 10,528,367 B1
(45) Date of Patent: Jan. 7, 2020

(54) EXECUTION OF WORKFLOWS IN DISTRIBUTED SYSTEMS

(71) Applicant: INTUIT INC., Mountain View, CA (US)

(72) Inventors: Chengjie Liu, Cupertino, CA (US); Edward K. Lee, Sunnyvale, CA (US); Hongbin Mao, Saratoga, CA (US); Ying Xie, Cupertino, CA (US); Zheng Yang, Cupertino, CA (US)

(73) Assignee: INTUIT INC., Mountain View, CA (US)

(*) Notice: Subject to any disclaimer, the term of this patent is extended or adjusted under 35 U.S.C. 154(b) by 218 days.

(21) Appl. No.: 15/695,322

(22) Filed: Sep. 5, 2017

Related U.S. Application Data

(60) Provisional application No. 62/383,232, filed on Sep. 2, 2016.

(51) Int. Cl.
 *G06F 9/46* (2006.01)
 *G06F 9/448* (2018.01)
 *G06F 9/48* (2006.01)

(52) U.S. Cl.
 CPC .......... *G06F 9/4498* (2018.02); *G06F 9/4843* (2013.01); *G06F 2209/482* (2013.01)

(58) Field of Classification Search
 CPC .................... G06F 9/4498; G06F 2209/482
 See application file for complete search history.

(56) References Cited

U.S. PATENT DOCUMENTS

| | | | | |
|---|---|---|---|---|
| 5,974,251 A * | 10/1999 | Ohta | ................... | G06F 17/2264 717/109 |
| 2008/0162938 A1* | 7/2008 | Struik | ................... | H04L 9/0844 713/171 |
| 2008/0320486 A1* | 12/2008 | Bose | ..................... | G06Q 10/06 718/105 |
| 2014/0115304 A1* | 4/2014 | Mauro | ................ | G06F 9/30178 712/226 |
| 2015/0025405 A1* | 1/2015 | Vairavan | ............. | G06F 19/3418 600/529 |

* cited by examiner

*Primary Examiner* — Camquy Truong
(74) *Attorney, Agent, or Firm* — Patterson + Sheridan, LLP

(57) ABSTRACT

A set of two or more workflow definitions is stored, wherein each workflow definition describes a workflow of an application. The set of two or more workflow definitions are used to implement a state machine of the application based at least in part on the two or more workflow definitions.

23 Claims, 14 Drawing Sheets

EXECUTION OF WORKFLOWS IN DISTRIBUTED SYSTEMS

CROSS REFERENCE TO OTHER APPLICATIONS

This application claims priority to U.S. Provisional Patent Application No. 62/383,232 entitled EXECUTION OF WORKFLOWS IN DISTRIBUTED SYSTEMS filed Sep. 2, 2016 which is incorporated herein by reference for all purposes.

BACKGROUND OF THE INVENTION

Using a computing system may involve the use of workflows, wherein a workflow is a sequence of steps and/or actions to be performed by the computing system. For complex computing systems, these workflows should be run as efficiently as possible to conserve time and financial resources.

BRIEF DESCRIPTION OF THE DRAWINGS

Various embodiments of the invention are disclosed in the following detailed description and the accompanying drawings.

DETAILED DESCRIPTION

Figure 1:
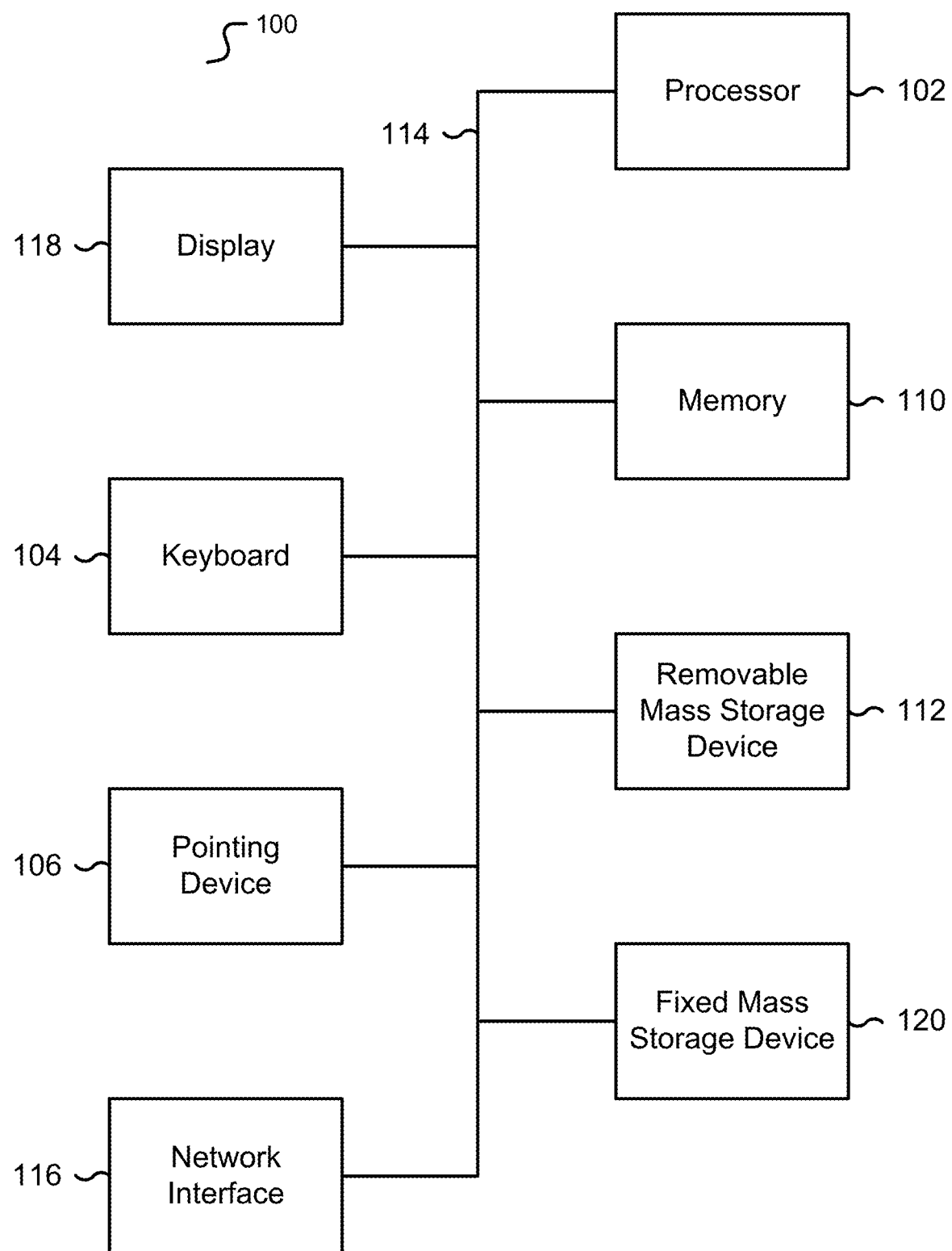
FIG. 1 is a functional diagram illustrating a programmed computer/server system for recognizing common steps in a set of workflows with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Using workflow definitions associated with a set of workflows to implement a state machine of an application is disclosed. Recognizing common steps in the set of workflows is disclosed. One way to make workflow execution efficient is realizing the set of workflows may have shared steps that may be needlessly repeated when two or more workflows are run. This problem may be exacerbated when workflows are designed by two or more users and/or at two or more different times. Each workflow designer may be constrained to express their designed workflow in a stylized and/or restrictive fashion, such as a declarative definition, rather than an imperative definition. In one embodiment, workflows are defined in YAML as a DSL (domain specific language). The YAML workflow definitions are used to recognize if a common step exists between two or more workflows.

An imperative definition of a workflow may be intuitive for software users to express, but focuses on the "how"; the control flow of a computing step. Imperative constructs such as loops, conditionals and/or callbacks make the definition state contextual and challenging to compare in order to recognize a common step. By contrast, a declarative definition of a workflow focuses on the "what"; the computing step logic without describing how to accomplish it.

A comprehensive way to specify a set of workflows is by way of a state machine. Once two or more workflows are mapped to a state machine, common steps may be identified, wherein a "common step" is referred to herein as a workflow step that given similar, or common, inputs reaches a similar, or common output state and/or generates similar, or common output results. The term "similar" is referred to herein as being essentially the same without regard to items of unimportance. An example of something similar may be one version of a library built from the same source code tree at two different times, thus having two libraries each having different datestamps and/or timestamps. While the libraries are identical from the perspective of a programmer, that is have the same version of API and same version of functions, they only differ by their datestamp and/or timestamp, and are thus similar.

Mapping a declarative workflow definition to a state machine representing the entire set of workflows in order to recognize common steps is disclosed. Steps in each workflow may be sequential and/or parallel. Data may be generated by a given step and consumed by a subsequent step, and this data is referred to herein as an "artifact". Artifacts may be consumed by other steps in a workflow or stored persistently for future use. In one embodiment, each artifact and each step in a workflow may be identified by a content-based fingerprint, for example a hash. Data with the same content will have the same hash. Steps that perform the same operation may also have the same hash. The results at each point in a given workflow may be identified by a "cache hash", referred to herein as a function of the hash of the input data and the hashes of the steps that have been performed up to that point. Note that the hashes of intermediate artifacts may not be needed to generate the cache hash. Cache hashes may be used to identify common steps in a workflow.

The disclosed techniques are applicable to any workflow environment, for example that of data streams or logical execution plans in data lineage such as that in Apache™ Spark, and/or workflows in distributed systems such as that in Jenkins™ Pipeline. Without limitation an example for execution of workflows in distributed systems is described in detail. A "distributed system" as referred to herein includes any system that has an application and/or microservice running on two or more containers, nodes, virtual machines, and/or physical machines. A distributed system comprises components that may independently fail and recover and where the components communicate with each other over communication channels that may not be completely reliable. A "container" and/or "container instance" is referred to herein as a program that runs in an isolated environment from other programs, and may be used as steps in a workflow.

The modern use of containers, with operating-system virtualization, has made efficient two types of applications: 1) Running large complicated batch jobs such as builds and tests using a queue of complex jobs wherein when one phase of a job finishes, it spins up many substeps that in turn spin up other subsubsteps, and so forth; and 2) Deploying microservices, scalable distributed applications comprising multiple tiers of components, for example a simple three-tier web application may include three tiers of components: a front-end code, a business logic, and a back-end database.

When designing distributed systems, it is useful to specify how they work as a distributed state machine. A "distributed state machine" is referred to herein as a state machine that may be implemented to run in a distributed system, and tolerates component failures and recoveries and handles communication failures. With distributed systems, software runs on multiple servers in different container/virtual machine/physical machine locations. Each server is not 100% reliable, and thus the servers must tolerate failures and/or recover from partial failures. As all servers cannot be restarted at once, there are combinations of failures that may be mapped to states in a state machine. While it would be burdensome or impossible for designers to directly describe a state machine and enumerate all possible states where to recover from and enumerate all possible actions for recover or further degradation, indirectly inferring a state machine from workflow definitions is disclosed to relieve the burden from designers and/or automate the process.

Using declarative workflow definitions gives an inherent flexibility in how to accomplish a given step, and generally forces a designer to describe the step in a repeatable way. This not only permits the disclosed techniques to recognize common steps and cache intermediate data to improve efficiency, it also allows for efficient automated re-execution of steps when a node in the distributed system goes through temporarily or permanently failure. That is, if steps 1-2-3-4 are part of a workflow and suffers a failure in step 4, by reconstructing the state machine using workflow definitions and keeping intermediate state, the system need only repeat step 4, rather than starting again at steps 1-2-3.

FIG. 1 is a functional diagram illustrating a programmed computer/server system for recognizing common steps in a set of workflows with some embodiments. As shown, FIG. 1 provides a functional diagram of a general purpose computer system programmed to recognize common steps in a set of workflows with some embodiments. As will be apparent, other computer system architectures and configurations can be used for recognizing common steps in a set of workflows.

Computer system 100, which includes various subsystems as described below, includes at least one microprocessor subsystem, also referred to as a processor or a central processing unit ("CPU") 102. For example, processor 102 can be implemented by a single-chip processor or by multiple cores and/or processors. In some embodiments, processor 102 is a general purpose digital processor that controls the operation of the computer system 100. Using instructions retrieved from memory 110, the processor 102 controls the reception and manipulation of input data, and the output and display of data on output devices, for example display and graphics processing unit (GPU) 118.

Processor 102 is coupled bi-directionally with memory 110, which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions, for example programmed instructions. For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory, not shown. The processor 102 may also include a coprocessor (not shown) as a supplemental processing component to aid the processor and/or memory 110.

A removable mass storage device 112 provides additional data storage capacity for the computer system 100, and is coupled either bi-directionally (read/write) or uni-directionally (read only) to processor 102. For example, storage 112 can also include computer-readable media such as flash memory, portable mass storage devices, holographic storage devices, magnetic devices, magneto-optical devices, optical devices, and other storage devices. A fixed mass storage 120 can also, for example, provide additional data storage capacity. One example of mass storage 120 is an eMMC or microSD device. In one embodiment, mass storage 120 is a solid-state drive connected by a bus 114. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110, for example RAM, as virtual memory.

In addition to providing processor 102 access to storage subsystems, bus 114 can be used to provide access to other subsystems and devices as well. As shown, these can include a display monitor 118, a communication interface 116, a touch (or physical) keyboard 104, and one or more auxiliary input/output devices 106 including an audio interface, a sound card, microphone, audio port, audio recording device, audio card, speakers, a touch (or pointing) device, and/or other subsystems as needed. Besides a touch screen and/or capacitive touch interface, the auxiliary device 106 can be a mouse, stylus, track ball, or tablet, and is useful for interacting with a graphical user interface.

The communication interface 116 allows processor 102 to be coupled to another computer, computer network, or telecommunications network using a network connection as shown. For example, through the communication interface 116, the processor 102 can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Throughout this specification "network" refers to any interconnection between computer components including the Internet, Bluetooth, WiFi, 3G, 4G, 4GLTE, GSM, Ethernet, TCP/IP, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor 102 through communication interface 116.

An auxiliary I/O device interface, not shown, can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: flash media such as NAND flash, eMMC, SD, compact flash; magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer/server system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems may also be utilized. Other environments may also be utilized, for example virtualized environments including without limitation: hardware-level virtualization such as a virtual machine (VM) such as a VMWare VM, operating-system level virtualization such as a Docker container and/or LxC Linux container, application-level virtualization, workspace-level virtualization, and/or service virtualization.

Figure 2A:
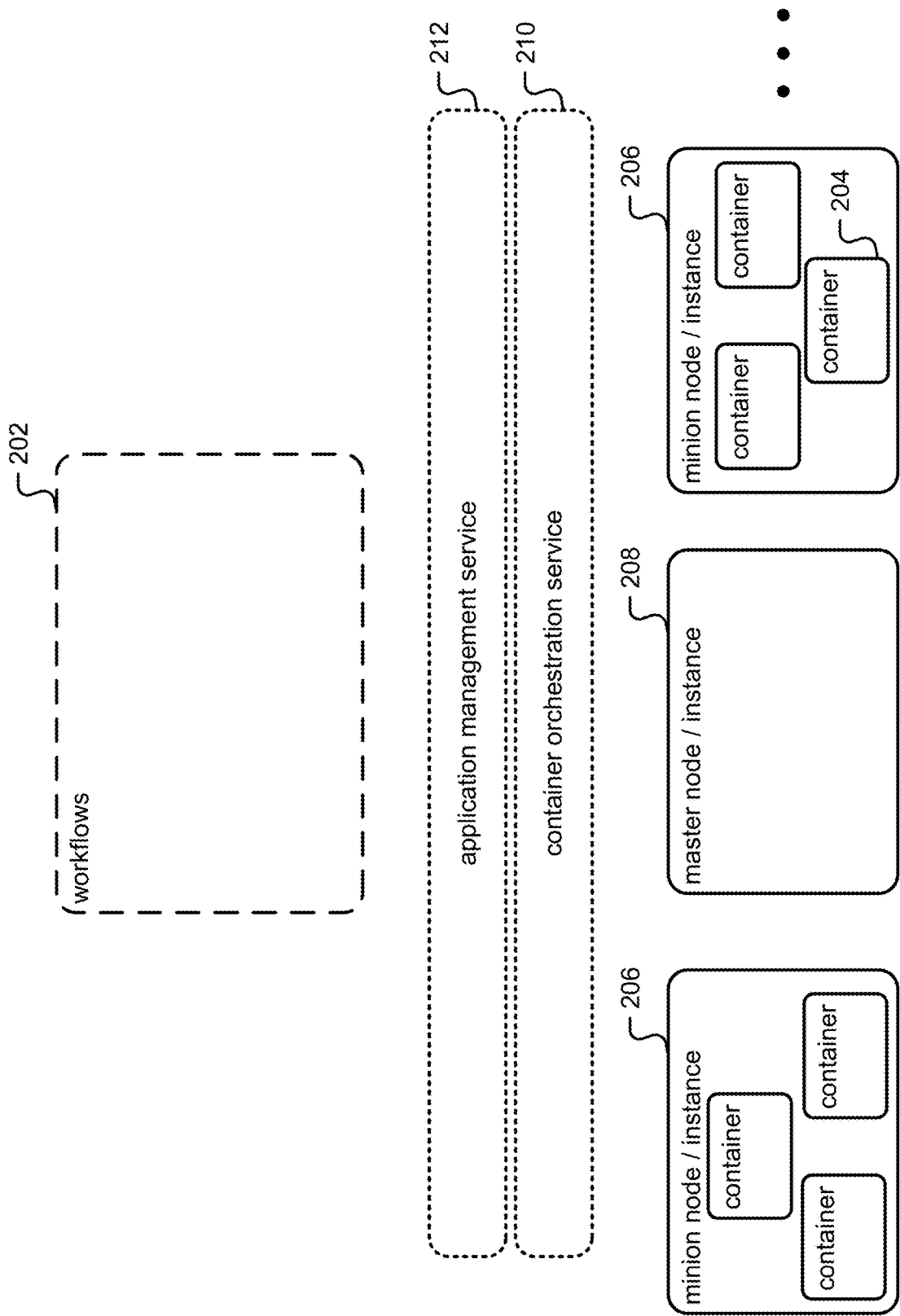
FIG. 2A is a block diagram illustrating an embodiment of a system for workflow execution.

FIG. 2A is a block diagram illustrating an embodiment of a system for workflow execution. Workflows (202) associated with a distributed application are run on a plurality of containers (204). One or more containers (204) are virtualized within a single "minion" or node (206) worker machine, wherein each node is a physical machine and/or VM. There may be a plurality of nodes (206) of which a master node (208) is used to manage and/or coordinate as per a container orchestration service (210) such as Kubernetes, Mesos, and/or Docker Swarm. An application management service (212) is used to store workflow definitions and use them to implement a state machine reflective of the distributed application.

Figure 2B:
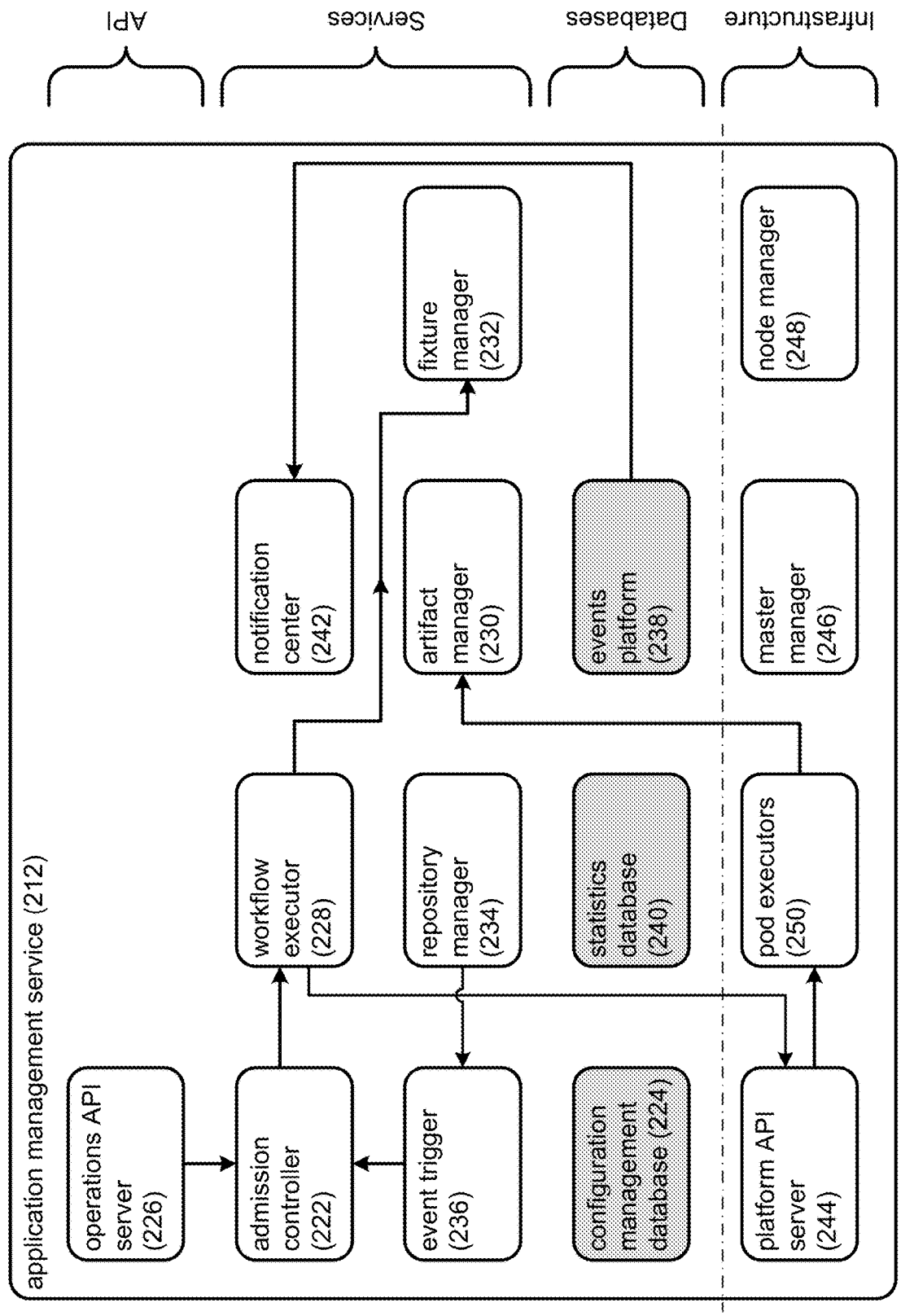
FIG. 2B is a block diagram illustrating an embodiment of a system for application management with control flows.

FIG. 2B is a block diagram illustrating an embodiment of a system for application management with control flows. In one embodiment, the system of FIG. 2B is the application management service (212) of FIG. 2A. The control flows are depicted by arrowed lines.

An artifact is a collection of files/directories that may be used as input or output to a step in a workflow, wherein a "file" is a filesystem file and a "directory" is a filesystem directory. Artifacts may be "internal" and/or "intermediate", in which case they may be referenced only within the execution of a particular workflow. Internal artifacts may be automatically garbage collected, for example garbage collected after 7 days. Artifacts may be exported within the system of FIG. 2B, and as exported they may be referenced by other workflows. Exported artifacts may also be automatically garbage collected, for example exported artifacts may be garbage collected after 6 months. Artifacts may also be tagged in part to be retained indefinitely, and such tagged artifacts may be manually deleted.

A "fixture" as referred to herein is a service needed to run a workflow. One example of a fixture is a MySQL service needed to run a test. A dynamic fixture may be created automatically by the system of FIG. 2B before executing a workflow by running a specified container that implements the service. A dynamic fixture generally starts in the same state and behaves in the same manner each time it is created. This may ensure that the execution of a workflow that uses the dynamic fixture is deterministic each time it is run. A static fixture may be any service that is registered with the system of FIG. 2B, for example a Windows VM running SQL Server or any accessible SaaS service. A static fixture may be placed into a well-known state before it is used. This may ensure that the execution of a workflow that uses the static fixture is deterministic each time it is run. In one embodiment, a static fixture is specified using labels, for example "mem=2mib os=Windows" and/or "db=RDS". A static fixture may be "exclusive" or "shared":

a. An exclusive fixture may only be used by one workflow at a time, thus workflows that need a static fixture may generally wait until it becomes available; and b. A shared fixture may be used by multiple resources concurrently.

A persistent "volume" as referred to herein may be used to store data used by workflows. In one embodiment, anonymous volumes are volumes that exist only within the context of a specific executing workflow, as opposed to named volumes being volumes that exist independently of workflows. Anonymous volumes are generally created to provide temporary storage space for workflows. The content of anonymous volumes are typically not important to the execution of workflows. Named volumes may hold specific data for use by workflows. In some cases, the data on a named volume may remain the same or change between runs of a workflow.

A "secret" as referred to herein is an encrypted string that may be included in templates to avoid exposing secret in source repositories. The secret is then decrypted just prior to when it is used during the execution of a workflow. A set of one or more "configuration parameters" are stored in a database (224) and may be referenced by name from within templates. These configuration parameters avoid having to hardwire parameters in source repositories. As referred to herein, a "policy" template is used to specify automatically triggered workflows. Common "triggers" as referred to herein may include time based triggers, for example triggers based on cron, and triggers based on commits, pull requests, and/or merges to repositorities.

For the system of FIG. 2B and as referred to herein, a "project" is a template used to create a catalog of workflows that may be executed by users. The project template may allow convenient grouping and identification of commonly used workflows. A "repo" is referred to herein as a repository such as a source code repository, for example a git repository and/or a mercurial repository. A repo documents and tracks changes to a set of files and directories over time. A "commit" is referred to herein as a change made to a repo, for example made to a git repository. Changes may be identified using hexadecimal signatures such as ea61c67d. A workflow may be a sequence of steps to be performed on a commit. An "image" is referred to herein as a container image, such as a Docker container image, including a packaged binary that may be run to create a container instance.

The system of FIG. 2B includes services and components. For example, the admission control component (222) delays/limits workflows until there are sufficient resources to run the workflow, at which time it admits work as resources become available. This allows implementation of QoS (Quality of Service) controls in part by deciding which jobs to admit next, and prevents overloading the container orchestrator (210) with too much work that cannot be scheduled. The admission control (222) prevents resource deadlocks when executing complex workflows. The admission control (222) launches one or more (WFE) workflow executors (228) for new workflows and monitors the workflow executors (228)

A configuration management database (224) (CMDB) stores the configuration and operational state of all system component and services including active workflows, fixtures, and so on. An operations API server (226) serves an API to handle YAML verification of workflow definitions, manages state needed by a UI for application management, handles events from the workflow executor (228), and provides miscellaneous and utility logic. In one embodiment, the CMDB (224) includes a configuration, operational, historical, and stats database.

The workflow executor (228) runs a workflow, manage workflow state transitions, and launches new steps. In one embodiment, one workflow executor (228) service is used per workflow and deployment, and the executor (228) exits after deployment starts. With the implemented state machine, a workflow executor (228) may restarts itself via the container orchestration service (210) and restart failed steps if interrupted, for example if the associated node restarts or reboots. The workflow executor (228) may schedule dynamic fixtures, reserve static fixtures, and/or schedules deployments.

An artifact manager (230) supports querying and searching for artifacts. The artifact manager (230) provides lifecycle management of artifacts, for example the above-mentioned retention policies over 7-days, 6-months, and/or manual deletion only. The artifact manager (230) may query and/or find internal/external artifacts. The artifact manager (230) may serves and/or manage a table of artifacts. The artifact manager (230) may collects and catalog output artifacts.

A fixture manager (232) manages a table of static fixtures and persistent volumes. In one embodiment, the fixture manager (232) manages reservations for fixtures and volumes, for example some fixtures may be shared, while others cannot. The fixture manager (232) may allow the creation of fixtures/volumes.

A repository manager (234) or repo manager is a gateway to a repo such as git. It interfaces using an approval API, and may catch git state. The repository manager (234) may provide a query API for git state for example with commits, branches, commit data, and so on. A "branch" is referred to herein as a branch in a repo such as master or default, wherein each branch represents an alternate timeline of changes that may diverge and/or merge with other branches over time. An event trigger (236) triggers policies, triggers events from webhooks, polls repositories, updates the CMDB (224), and/or submits jobs via the operations API server (226).

An event platform (238) such as Kafka is used to collects events, provide statistics, provide a notification center, and manage workflow executor (228) events. In one embodiment, a statistics database (240) is separate from the CMDB (224) and talks with container advisors such as cAdvisor, and/or sends data to the events platform (238) like Kafka. In one embodiment, Prometheus is used as a statistics database to monitor volume stats, monitor filesystem and block device stats such as capacity and performance, monitor container orchestration data, for example Kubernetes data from cAdvisor, and monitor internal stats.

A notification center (242) processes events from the events platform (238) like Kafka, logs events to the CMDB (224), distribute events according to system/user preferences including UI and/or email notification. In one embodiment, an in-memory data structure store/database like Redis is used for caching and for workflow executor (228) notification.

A platform API server (244) serves as an interface to the container orchestration service (210) like Kubernetes. The platform API server (244) abstracts infrastructure services like Kubernetes, AWS (Amazon Web Services), GCP (Google Cloud Platform), and Microsoft Azure. The platform API server (244) may create and runs orchestration/

Kubernetes specs, monitor the status of jobs and/or deployment, create volumes, modify volumes, and/or delete volumes.

A master manager (246) monitors the health of the container orchestration/Kubernetes master, terminates an unhealthy master, and starts a new orchestration/Kubernetes master in the event of a terminated master. Similarly, a node manager (248) monitors health of all nodes and/or minions. The node manager (248) may terminate/restart unhealthy nodes and/or minions. The node manager (248) may also monitor "spot" pricing of cloud instances, submit bids, and/or switch to "on-demand" instances when prices are high. The node manager (248) may also switch back to spot instances when prices drop. The node manager (248) may regularly monitor and report spot prices for each instance.

A pod executor (250) manages container orchestration units, for example Kubernetes pods. The pod executor (250) may initialize a container, in part by unpacking one or more artifacts, setting up environment variables, and/or replacing a user entrypoint with a wrapper entrypoint, which may perform additional setup, cleanup or coordination operations. The pod executor (250) may manager a user container wrapper, in part by setting up environment variables, invoking a user entrypoint, tarring output artifacts for saving, recording exit status, and informing a wait container that a step is complete. A pod executor may also include a wait container to collect live logs from the container orchestration service (210) like Kubernetes, upload logs and/or artifacts, and report status to a workflow executor (228).

Figure 3A:
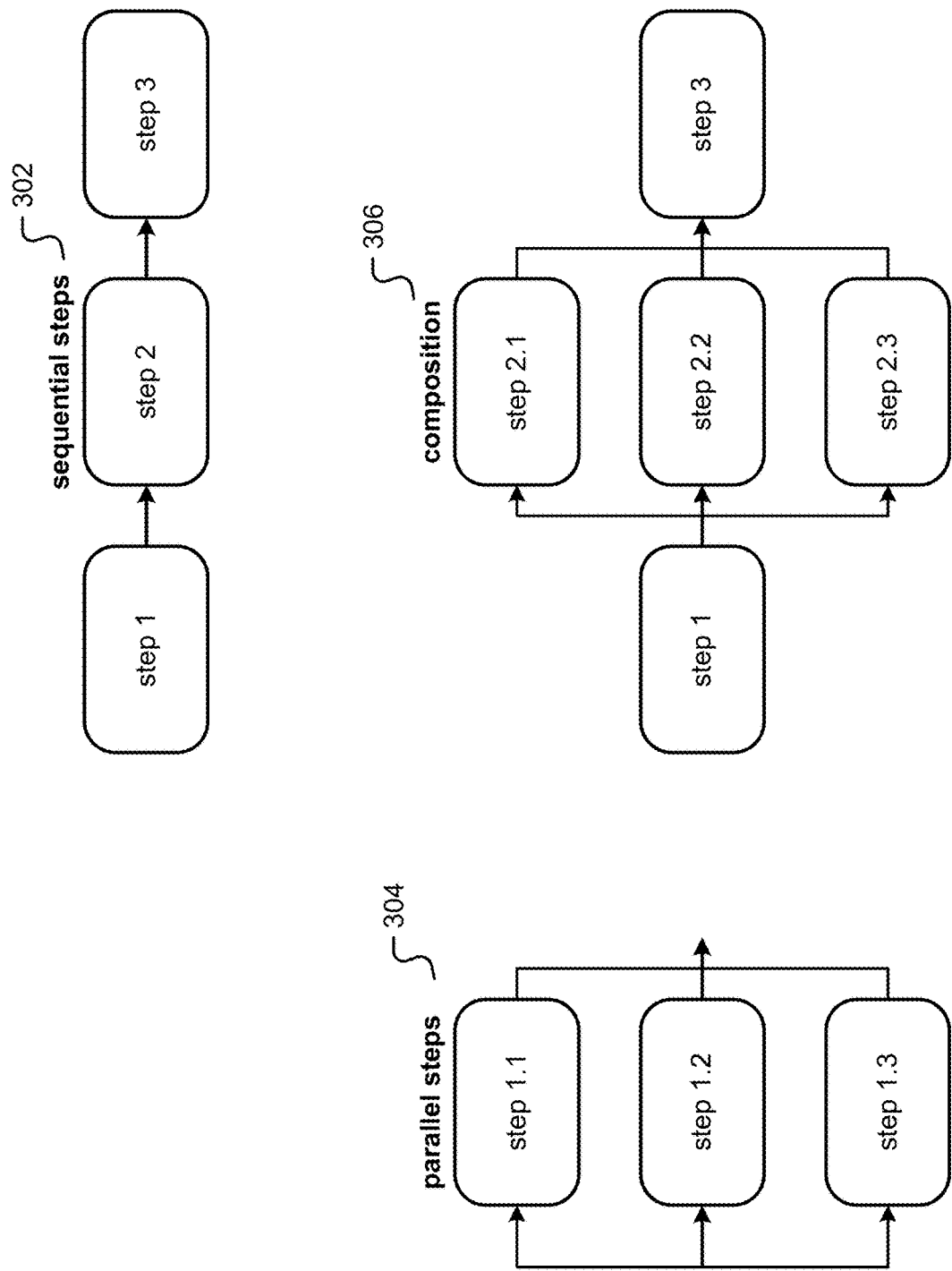
FIG. 3A is an illustration of workflow steps.

FIG. 3A is an illustration of workflow steps. In one embodiment, the workflow steps of FIG. 3A are carried out by the application management service (212) of FIG. 2A and FIG. 2B.

As described above, distributed systems typically include individually running components that communicate with each other via potentially unreliable communication channels to provide a common service or related set of services. As such, distributed systems deal with challenges that may not exist or are uncommon in centralized systems. These challenges include tolerating and recovering from component and communication failures.

Tolerating failures, which means continuing to operate in the face of component and communication failures, typically means that state must be redundantly stored and actions that modify state must be retry-able or automatically re-executable, so that when there is a failure, the failed actions can be retried on functioning components of the system. In some cases, end-to-end recovery will require users to query the current state of the system and repair it before continuing operation.

One way to design such systems is to use redundant storage systems with services running on redundant servers in a highly available configuration in which they continuously mirror state and state changes between servers to ensure fast reliable failover. Another paradigm is to implement the system as a set of distributed state machines with the relevant state stored in a redundant manner and idempotent state transitions between states. There are also serverless computing platforms where actions are triggered automatically in response to events such as new input data becoming available have been proposed and implemented by cloud infrastructure vendors such as Amazon (AWS Lambda) and Google (Google Cloud Functions).

Using a workflow methodology is a computing concept that has recently becoming more popular in DevOps environments as a way to automate and schedule work. Workflows are typically imperative and/or procedural in nature and typically allow specification of both sequential (302) and parallel (304) work, denoted using a dot notation to indicate parallelism in FIG. 3A. Workflows of significance are typically a composite (306) of both sequential and parallel steps, and may be arbitrarily composed and nested. In some cases, alternative actions may be taken on the basis of the result of user input and/or previous steps in the workflow. In most cases, failed steps may be retried. The result of completed or partially completed steps in a workflow may be cached and possibly reused in the event a failed workflow is re-executed.

Each workflow comprises a sequence of sequential and/or parallel steps, and may be arbitrarily nested. Each workflow may thus be conceptualized as a graph of sequential and parallel steps as shown in FIG. 3A. A basic action/execution unit/component of a workflow is a step, and a step is executed by running a container. A step itself may be a workflow, which in turn contains other steps. Sequential steps (302) include steps that are executed in sequence, one after the other. A sequence of steps (302) may itself be considered a step that may be used to compose additional steps and workflows. Parallel steps (304) include steps that are executed concurrently, all at the same time. A group of parallel steps (304) may itself be considered a step that may be used to compose additional steps and workflows.

Distributed system designers may be familiar with declarative and desired state programming models, such as with configuration management systems like Puppet and Ansible. With these approaches, users declare the desired configuration state of the system rather than the specific steps that should be performed to configure a system. Such approaches may be used to create robust retry-able/re-executable descriptions and may work better when the system may be more knowledgeable on how to achieve a particular state than the user or when the action that is required is dependent on complex dependencies or systematic analysis of the current state of the system.

Figure 3B:
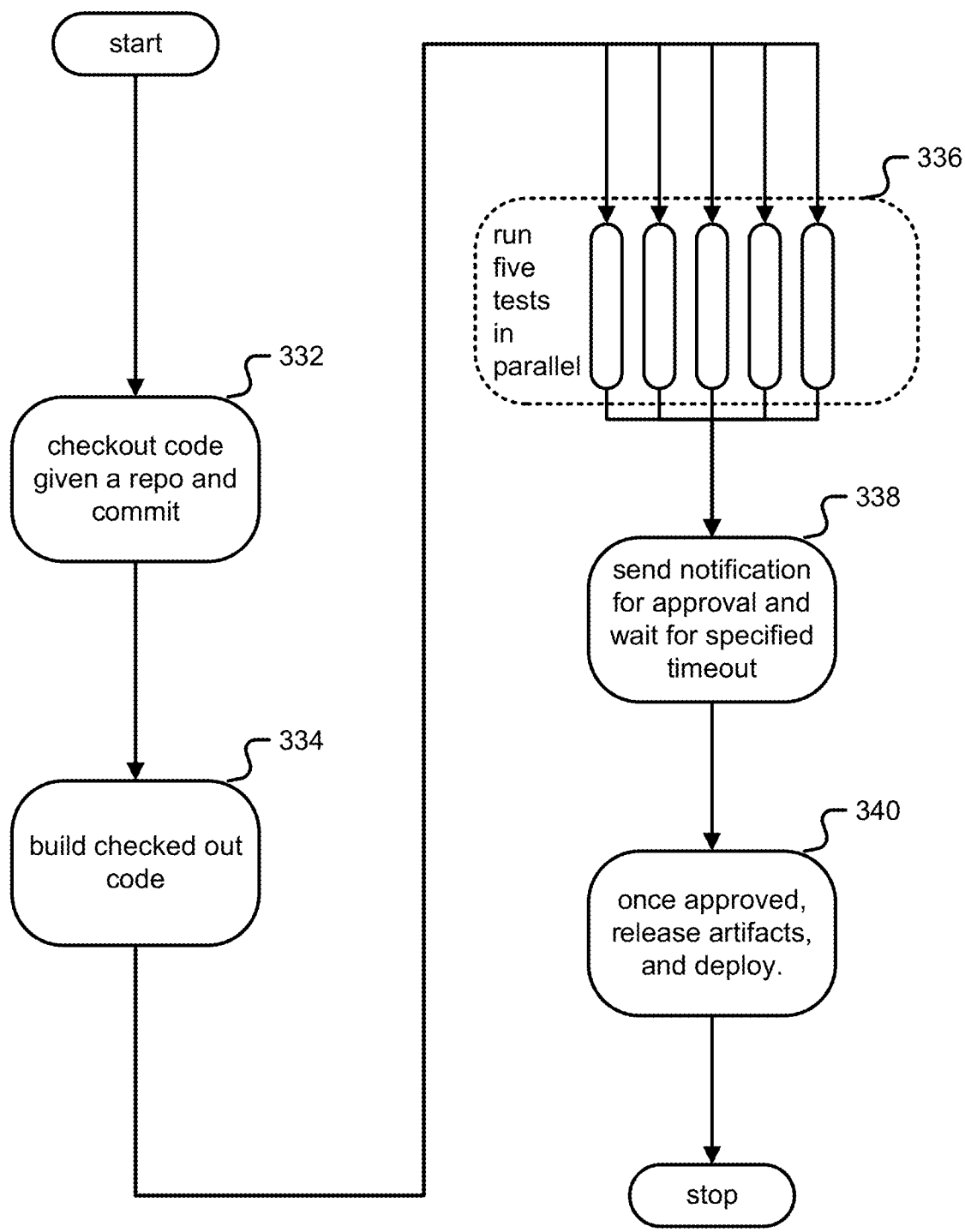
FIG. 3B is an illustration of a sample workflow.

FIG. 3B is an illustration of a sample workflow. The sample workflow may be used for continuous integration (CI) of a distributed application. In the first workflow step (332), code is checked out from a repo and the code is subject to a commit. In a sequential step (334), the checked out code is built. In a further sequential step (336) five tests are run in parallel, depicted in FIG. 3B as a set of five parallel steps. When all five tests are successful, in sequential step (338), notification for approval is sent, subject to a specified timeout/wait. In a sequential step (340), once approved, the artifacts are released.

Figure 3C:
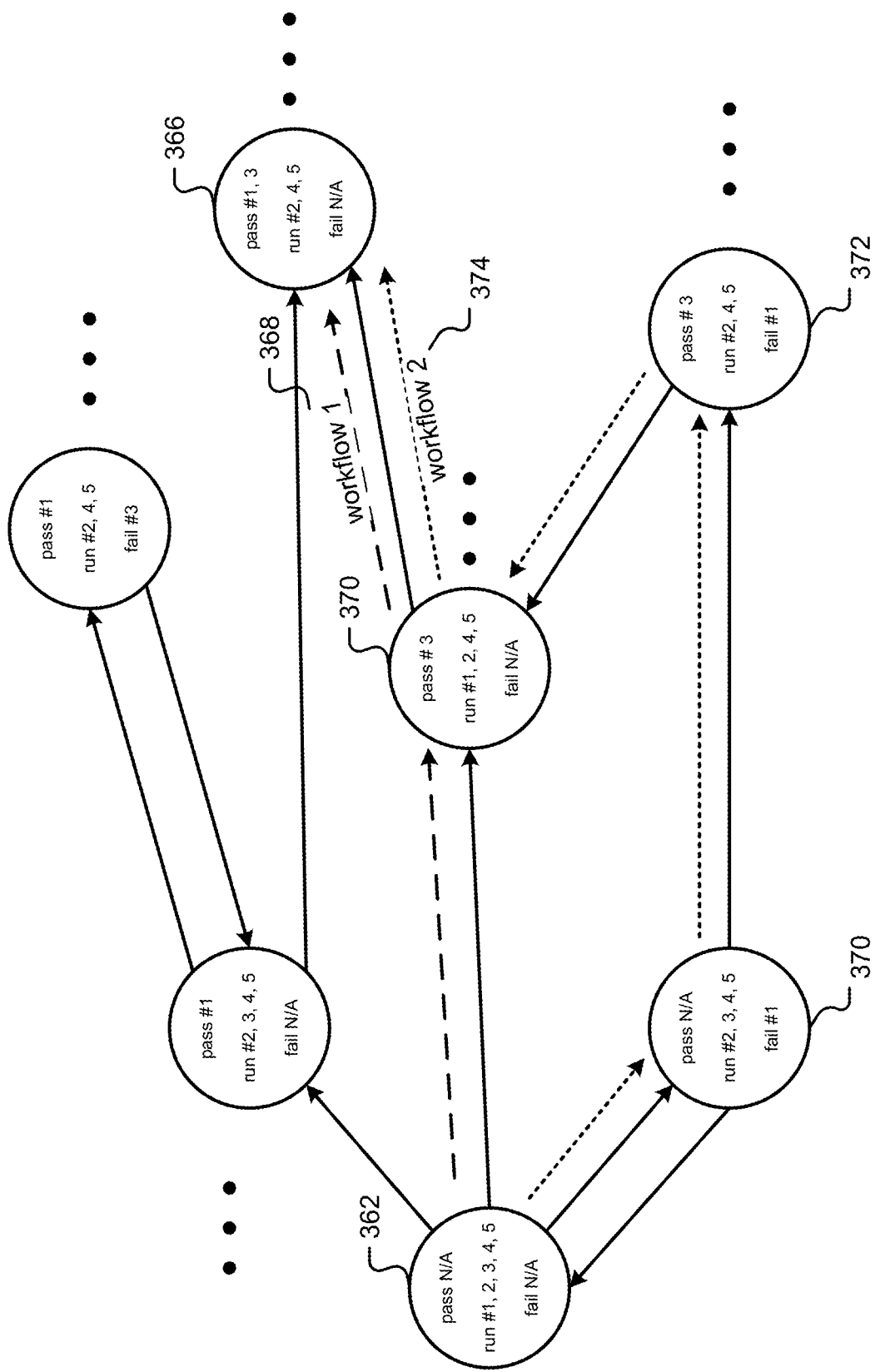
FIG. 3C is an illustration of a sample state machine.

FIG. 3C is an illustration of a sample state machine. Each state in the state machine may reflect the current state of executing a workflow include the resulting artifacts that have been generated. If two workflows reach the same state, then they have started with the same inputs, performed the same operations, and generated the same outputs. In one embodiment, the sample of FIG. 3C is part of a larger distributed state machine representing a set of workflows of FIG. 3B. The sample of FIG. 3C is related to the five parallel steps of test in step (336), and shows states in part as reflecting success and failure of the first three tests of the five tests.

As shown in FIG. 3C, complexity of a distributed state machine increases rapidly for even simpler workflows. State (362) reflects a state where all five tests are running and no tests have either passed or failed. In the event test #3 passes while the remaining four tests are running, control is transitioned to state (370), and in the further event test #1 passes while the remaining three tests are running, control is transitioned to state (366). This path of states (362, 370, 366) and associated transitions may be considered one workflow called "workflow 1" (368). With imperative workflow management this might for example be represented as a script that uses conditionals to handle the transitions of what to do when the tests pass.

In the event test #1 fails while the remaining four tests are running, control is transitioned to state (370), which may transition to a state where test #3 passes (372) while restarting test #1 to transition to state (370), wherein test #1 now passes to transition to state (366). This path of states (362, 370, 372, 370, 366) and associated transitions may be considered a second workflow called "workflow 2" (374). Thus the distributed state machine and two workflows embedded in the state machine are reflected in FIG. 3C. Note that the two workflows described share states and transitions in the state machine.

Without limitation, an example of a system using an application management service (212) is a DevOps system where operations are performed on commits of source code to repos. Although the example below addresses commits of source code, any person having ordinary skill in the art will understand the concepts are generally applicable to collections of other types of data.

A user can specify for each source code repo, branch, user, project, or directory, a set of workflows to be automatically performed as commits are added to the repo. Workflows may be triggered by and/or operating on commits. As workflows run, they may generate intermediate artifacts, which may also be referred to herein as "derived objects". Artifacts may be used between steps in a workflow or between invocations of multiple workflows.

Artifacts may be stored and persisted indefinitely until they are deleted by a user or automatically by the system based on various criteria. Some artifacts may be created by the user by uploading data into the system rather than as a result of a step in a workflow. Artifacts may themselves trigger other workflows the same way a commit may trigger a workflow.

The state of the system comprises commits, artifacts and metadata. The workflows may specify how the state of the system may be transformed from one state to another. Workflows may specify how one artifact may be derived from another artifact. Each workflow and step in the workflow may be retried and/or automatically re-executed in the event of failure. In one embodiment, a workflow and step in a workflow are idempotent and produce the same results each time they are retried, or at least similar enough that users do not care about the differences. For example, if the difference between two results is a different datestamp and/or timestamp annotating when the result was generate but the other data is the same, a user may not care about the difference. This allows the system to automatically and transparently retry/re-execute failed step/workflows and to cache the results of steps in a workflow. Automatically re-executing a failed step/workflow gives the user more confidence of higher system reliability even while failures may not be uncommon. Caching the results of steps in this manner allows the system to reuse cached work to save money and time while still reliably producing predictable results.

A workflow is traditionally an imperative construct. Many use cases exist where workflows and steps when applied to the same input data, may be retried and produce similar and/or consistent results from one run to another. By specifying workflows in a more functional/declarative manner, what can be done by a workflow may be more restricted but make the workflows easier to understand, analyze and optimize. These later characteristics are useful in creating more reliable, efficient, distributed systems with predictable behavior.

Because many programmers are more comfortable in writing imperative code, they may be uncomfortable and/or unable to directly determine and express the complete state machine behind a set of declarative workflows. As an intermediate step, programmers may be more comfortable to define work in terms of workflows. In one embodiment, the programmer may define an individual workflow in a declarative language. A benefit of this is that an application management service (212) may ultimately create and execute a functional/declarative system such as a distributed state machine automatically from the set of workflows.

Declarative Workflow Definitions

Without limitation, an example of a declarative workflow definition may be written in YAML, used as a DSL (Domain Specific Language).

Containers. One example of a container template that checks out source code and creates an output artifact containing the source code is:

```
---
type: container
name: axscm-checkout
description: Checks out commit to/src and export it as an artifact
inputs:
   parameters:
   commit:
      default: "%%session.commit%%"
   repo:
      default: "%%session.repo%%"
outputs:
   artifacts:
   code:
      path: /src
container:
   image: get.applatix.io/applatix/axscm:v2.0
   resources:
   mem_mib: 256
   cpu cores: 0.1
   command: axscm clone %%repo%% /src --commit %%commit%%
```

This template uses the image get.applatix.io/applatix/axscm:v1 which is stored in a system (212) Docker registry rather than the default DockHub registry. This container image contains various source control tools such as git and provides a generic wrapper command for checking out code no matter what source control system a user uses.

The template also defines two inputs called repo and commit which tell the system (212) where to get the source code. The default statement indicates that the input parameters are optional, and if not specified, will be filled in using the current session, which may be the GUI or the policy manager that automatically runs jobs in response to a commit or push event.

The template generates one output which is an artifact and/or set of files named code. The artifact may be created by collecting all the files that were checked out and stored in the/src directory.

Note the use of the optional resources keyword to specify how much memory and cpu to reserve for running the container. In one embodiment, by default containers are allocated 1000 MiB (1GiB) and 1 CPU core. The memory reservation may be a hard limit wherein if the container exceeds the reservation, it will be terminated. The cpu reservation may not be a hard limit but used primarily for packing containers onto nodes and for share-based cpu allocation. In one embodiment, default values are fine for most applications but may be overridden if a given container/step may benefit from significantly more resources or if runs often and the user wants to reduce the cost of running the container.

A golang build template may include:

```
---
type: container
name: example-build
description: Build the code
inputs:
   artifacts:
   - from: "%%code%%"
     path: /src
   parameters:
   code:
outputs:
   artifacts:
   binary:
     path: /src/main
container:
   image: golang:1.6
   resources:
   mem_mib: 256
   cpu cores: 0.1
command: sh -c 'cd/src && ls -ltr && go build main.go'.
```

This template uses a golang:1.6 image from DockerHub and may expect the source code to be found in/src. The template may have one input artifact named code, which will be unpacked and placed at/src. The template may generate an output artifact named binary, which contains the source code as well as the result of the build.

Workflows. The above section defined container templates for checking out code and building code, and workflow templates are used to put these together. Workflows allow a user to use other templates as steps in a larger process. Workflows may themselves be nested and used as steps in other workflows. The following example workflow checks out code and then builds it:

```
---
type: workflow
name: example-workflow
description: Example workflow
inputs:
   parameters:
   commit:
      default: "%%session.commit%%"
   repo:
      default: "%%session.repo%%"
steps:
-
   checkout:
   template: axscm-checkout
-
   build:
   template: example-build
   parameters:
   code: "%%steps.checkout.code%%"
```

The workflow takes two input parameters named commit and repo. The workflow comprises of two steps, called checkout and build. The checkout step invokes the axscm-checkout template previously defined. As the template takes two optional parameters, without specification the template use its default values. The build step invokes the example-build template with one parameter, code, which is bound to the code artifact generated by the preceding checkout step. The output artifact from the checkout step is used as an input artifact to the build step.

Taking this example a step further and adding some tests as well and a release step, the YAML workflow definition now reflects a workflow associated with FIG. 3B:

```
---
type: workflow
name: example-workflow
description: Example workflow
inputs:
   parameters:
   commit:
      default: "%%session.commit%%"
   repo:
      default: "%%session.repo%%"
steps:
-
   checkout:
   template: axscm-checkout
-
   build:
   template: example-build
   parameters:
   code: "%%steps.checkout.code%%"
-
   test1:
   template: example-test
   parameters:
      code: "%%steps.checkout.code%%"
      binary: "%%steps.build.binary%%"
   test2:
   template: example-test
   parameters:
      code: "%%steps.checkout.code%%"
      binary: "%%steps.build.binary%%"
   test3:
   template: example-test
   parameters:
      code: "%%steps.checkout.code%%"
      binary: "%%steps.build.binary%%"
   test4:
   template: example-test
   parameters:
      code: "%%steps.checkout.code%%"
      binary: "%%steps.build.binary%%"
   test5:
   template: example-test
   parameters:
      code: "%%steps.checkout.code%%"
      binary: "%%steps.build.binary%%"
-
   release:
   template: example-release
   parameters:
      code: "%%steps.checkout.code%%"
      binary: "%%steps.build.binary%%"
```

This workflow is similar to the previous workflow, but parallel test steps are added; steps that are not separated by a "-" will be run in parallel.

Policies. To use container templates and workflow definitions, policy templates are used to set things to trigger automatically.

```
---
type: policy
name: example-policy
description: Automatically run example-workflow
template: example-workflow
when:
  -
    event: on push
    target branches:
      - "*"
  -
    event: on pull request
    target branches:
      - "*"
notifications:
  -
    when:
      - on_failure
    whom:
      - committer
      - author
```

This policy template may specify when certain workflows or container templates should be run and when and to whom notifications should be generated based on the result of running the templates. In the above, the example-workflow, which was previously defined, should be run on push and pull-request events. The target_branch is a regular expression filter that may be used to limit the policy to only certain branches. In this case, the policy applies to all branches. The policy also specifies that notifications should be generated for failures and that the committer and author of the commit should be notified.

Deployments. Being able to run workflows is useful, but sometimes a user may also want to be able deploy and manage long-running services independently of a particular workflow. This is the purpose of a deployment template.

```
---
type: deployment
name: example-deploy
description: Deploy my spp
application:
  name: my-app
deployment:
  name: main
services:
  external:
    - name: "mygo"
      dns_prefix: mygo
      target_port: 8080
      ip_white_list:
        - 0.0.0.0/0
containers:
  - myapp:
      template: my-app
```

An application defines a namespace that may comprise multiple deployments. Each deployment may be deployed and upgraded independent. In this example, myapp only has one deployment. The services section defines exposed ports. The external services are exposed on the Internet. A DNS name and load balancer may be configured automatically for the deployment. A list of CIDRs allowed access to the service may also be specified. Lastly, the container template is specified that implements the deployment. If desired, liveness or readiness probes may also be specified.

Complete CI/CD Workflow. An example of a complete workflow for CI/CD ("Continuous Integration/Continuous Deployment") all the way from checkout to deployment comprises:

```
---
type: workflow
name: example-workflow
description: Example workflow
inputs:
  parameters:
    commit:
      default: "%%session.commit%%"
    repo:
      default: "%%session.repo%%"
steps:
  -
    checkout:
      template: axscm-checkout
  -
    build:
      template: example-build
      parameters:
        code: "%%steps.checkout.code%%"
  -
    test1:
      template: example-test
      parameters:
        code: "%%steps.checkout.code%%"
        binary: "%%steps.build.binary%%"
        testcase: 1
    test2:
      template: example-test
      parameters:
        code: "%%steps.checkout.code%%"
        binary: "%%steps.build.binary%%"
        testcase: 2
  -
    approve:
      template: axapproval
        parameters:
          required_approvals: pat@abc.com
  -
    deploy:
      template: example-deploy
```

This workflow checks out the sources, builds the code, runs tests in parallel, gets approval and then deploys the application. Note that: the build step generates a container image that is pushed to a Docker registry; the deployment step uses this image; the axapproval template is a standard template provided by the service (212); the deploy step completes when the application finishes deploying and does not wait for the application to finish running; and re-running the workflow will re-deploy the application, such that if an older version of the application is already running, it will be upgraded to the new version.

Projects. As a workflow designer creates many workflows for a project, it may be confusing to users which are the important workflows intended for end users and which are auxiliary or internal workflows. Projects provide a convenient way to package and "publish" projects to users.

```
---
type: project
name: HP 15C
description: Emulates the HP 15C Scientific Calculator.
actions:
  -
    name: run
    template: hp15c-emulator
  -
    name: build
    template: hp15c-build
  -
    name: test
    template: hp15c-test
categories: ["utility"]
publish:
  branches:
    - master
assets:
  icon: "/hp15c-icon.png"
  detail: "/README.md"
```

The above defines a project for an application that emulates the HP 15C Scientific Calculator. Projects appear as entries in the "Catalog" accessible from the GUI. The name, description, and any defined actions may be listed with the catalog entry. Each action defines a workflow that may be invoked by selecting the corresponding action from the GUI. In the above example, the project defines three actions: run, build, and test.

A project may be assigned to one or more user defined categories. The project may be displayed under the category to which it is assigned. To avoid "pollution" of the catalog with duplicate project entries from potentially numerous development branches, only the project that appears in "published" branches will appear in the catalog. In the above, only the master branch is published. If it is intended to also include an older version of the project, the older release branch may be added to the list of published branches and then both versions of the project may be accessible from the GUI.

An assets section may specify a graphical icon to associate with the project as well as a longer description or detail for the project. Assets may be specified using path names relative to the root of the source repository.

Fixtures. Particularly when running tests, it may be useful to be able to create stateful objects and services initialized with a known state as a part of a test environment. For example, a test may require a mongo database to store application state. Fixtures allow you to quickly provision such services. The service (212) supports at least two types of fixtures, dynamic and static.

```
---
type: container
name: mongodb
description: MongoDB container
container:
  image: mongo:3.2.9
---
type: workflow
name: mongodb test
``` description: Load mongodb with some data and run tests
```
fixtures:
  -
    mongodb-dynamic:
      template: mongodb
    mongodb-static:
      category: MongoDB
steps:
  -
    load:
      template: mongodb-load
        parameters:
          mongodb_ip: %%fixtures.mongodb-dynamic.ip%%
          mongodb_data: mymontest-data
  -
    test-dynamic:
      template: mongodb-test
      parameters:
        mongodb_ip: %%fixtures.mongodb-dynamic.ip%%
    test-static
      template: mongodb-test
      parameters:
        mongodb_ip: %%fixtures.mongodb-static.ip%%.
```

The above shows the use of dynamic and static fixtures. A dynamic fixture is implemented as a container template using a mongodb container available on DockerHub. An advantage of using a container infrastructure is the reusability of containers. A dynamic template works analogous to a step in a workflow except that the system waits for the fixture to start before running the rest of the workflow and one can access properties such as the IP address of the fixture.

A static fixture is obtained from a preconfigured pool of fixtures called MongoDB. The system may ensure that each static fixture is used by only one test at a time. The first step in the workflow loads the dynamic fixture with a dataset. The static fixture persists across workflows and is assumed to already contain any needed data. The second step then runs tests on the dynamic and static fixtures in parallel.

Array Parameters. A user may want to run the same workflow step multiple times but with different parameters. Instead of cutting and pasting which may be unwieldy and hard to maintain, array parameters may be used to be more efficient and safe.

```
steps:
  -
    test:
      template: my-test
      parameters:
        testcase: $$[test1,test2,test3]$$
  -
    encode:
      template: my-video-encode
      parameters:
        video: $$[vid1,vid2,vid3]$$
        format: $$[mp4,mov,wmv,mov]$$
        resolution: $$[1920×1080,1280×720,640×480]$$
```

In the above workflow, the $$ [ ] $ $ notation is used for running the same step in parallel over a combination of input parameters. First test1, test2, and test3 in run in parallel, and then run, in parallel, encoding jobs for all combinations of videos, formats and resolutions. This is a powerful feature for efficiently completing repetitive jobs.

External Artifact Repositories. The following is an example on how to store and access artifacts stored in external artifact repositories such as Nexus.

```
---
type: workflow
name: nexus-example
description: Upload and download an artifact to/from a Nexus repo
inputs:
  parameters:
    commit:
      default: "%%session.commit%%"
    repo:
      default: "%%session.repo%%"
    Group:
    Artifact:
    Version:
    Extension:
    Repo:
    Nexus_host:
steps:
  - checkout:
    template: axscm_checkout
  - build:
    template: example-build
    parameters:
      code: "%%steps.checkout.code%%"
  - nexus-upload:
    template: ax_nexus_upload
    parameters:
      artifact_to_upload: "%%steps.build.binary%%"
  - nexus-download:
    template: ax_nexus_download
  - consume:
    template: consume-artifact
    parameters:
      artifact_to_consume: "%%steps.nexus-download-.downlaoded_artifact%%"
```

The above example creates a build artifact, uploads the artifact to Nexus, downloads the same artifact, and then uses the downloaded artifact as a parameter. Most of the parameters in this workflow such as Group, Artifact, Version and so forth are required by Nexus to name the artifacts.

Below are the ax_nexus_upload and ax_nexus_download templates. The artifact to be uploaded is passed as the artifact_to_upload parameter to ax_nexus_upload and the downloaded artifact is accessed using the downloaded_artifact name. The templates use the get.applatix.io/nexus container provided by the service (212).

```
---
type: container
name: ax_nexus_upload
description: Upload artifact to Nexus
inputs:
  parameters:
    Group:
    Artifact:
    Version:
    Extension:
    Repo:
    Nexus_host:
    artifact_to_upload:
    artifacts:
      - from: "%%artifact_to_upload%%"
        path: "/artifact"
container:
  image: get.applatix.io/nexus:1.0
  command: sh -c 'cd/artifact && tar cf/artifact.tar . && axnexus --nexus_host %%Nexus_host%% upload --group %%Group%% --artifact %%Artifact%% --art_version %%Version%% --extension %%Extension%% --local_path/artifact.tar --repo_id %%Repo%%'
---
type: container
name: ax_nexus_download
description: Download artifact from Nexus
inputs:
  parameters:
    Group:
    Artifact:
    Version:
    Extension:
    Repo:
    Nexus_host:
outputs:
  artifacts:
    downloaded_artifact:
      path: /artifact
container:
  image: get.applatix.io/nexus:1.0
  command: sh -c 'axnexus --nexus_host %%Nexus_host%% download --group %%Group%% --artifact %%Artifact%% --art_version %%Version%% --extension %%Extension%% --local_path/artifact.tar --repo_id %%Repo%% && cd /artifact && tar xf/artifact.tar
```

Exported Artifacts. Above examples show how to create and use artifacts within a workflow. The below example shows how to create "exported" artifacts that persist outside of a single workflow and may be used, often much later, by other workflows.

```
---
type: workflow
name: create-artifact
description: Create and export an artifact
inputs:
  parameters:
    commit:
      default: "%%session.commit%%"
    repo:
      default: "%%session.repo%%"
steps:
  - create_artifact:
    template: axscm-checkout
outputs:
  artifacts:
    my_artifact:
      from: "%%steps.create_artifact.code%%"
  artifact_tags:
    - my_export_artifact
---
type: workflow
name: use-artifact
description: Use an artifact exported by another top-level workflow
steps:
  - use artifact:
    template: consume_artifact
    parameters:
      artifact_to_consume: "%%artifacts.tag.my_export_artifact.my_artifact%%"
```

The above example comprises two top-level workflows. A top-level workflow is one which may be run by itself rather than as part of another workflow. The first workflow creates and exports an artifact and the second workflow uses the exported artifact.

The create-artifact workflow creates an artifact by checking out code and then declaring an output artifact called my_artifact using a from statement, which is notable as it is used with an output artifact rather than in the context of an input artifact. This statement exports the fromartifact, %%steps.create_artifact.code%% so that it may be accessed by other workflows.

Note the use of artifact_tags to tag the exported artifact with the label my_export_artifact. The tag is then used by the use-artifact workflow to refer to the exported artifact as %%artifacts.tag.my_export_artifact.my_artifact%%.

Benefits of a Distributed State Machine.

By implementing the distributed state machine, the service (212) allows the construction of reliable distributed systems from unreliable components. When a step in a workflow fails, the failed step can be automatically retried. This also allows efficient execution of large workflows. If the workflow is interrupted, it may be resumed where it left off, rather than restarting the entire workflow, since the service (212) remembers which steps have been executed and which have not as part of the state of the system Event-based systems enable the creation of highly responsive systems that may not arbitrarily limit concurrency. Events may be processed on-demand as they occur without waiting in queues for servers or threads to become available. Resources to service the events may be dynamically provisioned. Thus, the service (212) provides responsive event handling. Resources needed to service events may be provisioned on demand as needed and de-provisioned when no longer needed, in contrast to other systems where servers for serving requests are continuously left running even when the system is idle.

One benefit of a service (212) is that workflows and steps in the workflow may execute as soon as the needed inputs are available. In particular, execution of the workflow is not constrained by arbitrary dependencies that may be introduced by the use of a sequential programming paradigm.

As described below, the service (212) provides efficient artifact naming and handling. Artifacts may be generated and used only during the execution of the workflow and thus may be managed completely within the system (212) by an artifact manager (230). Global names for accessing such artifacts outside the system are not required. One benefit of automatic artifact management is that the system may decide what type of storage to use. In some cases, temporary, local storage may be used for storing artifacts, which is cheaper and higher performance than shared networked storage such as SAN/NAS.

For example, if an artifact is generated by a step1 and consumed by step2, the artifact may be stored locally on a node that runs both step1 and step2. Alternatively, if step1 and step2 run on different nodes, node1 and node2 respectively, a local copy of the artifact generated on node1 may be copied to the local storage of node2 without the need for shared network storage.

Artifacts may be copied, stored or otherwise managed in their entirety when a step completes, rather than as each individual data blocks are written/generated. By contrast, in many networked systems, each write by an application must be handled synchronously because the infrastructure on which the application runs does not know that only certain points in the computation need to be persisted and shared with other applications.

In addition to efficient use of local storage, many other types of storage optimization such as the use of cheaper but slower storage is possible with the service (212) given the understanding of workflow structure derived from the distributed state machine.

One benefit of the service (212) is reducing the number of "false" persistence and synchronization points that must be preserved. By contrast, when running a general purpose application in a VM, for example, any write and any message sent may need to be persisted to preserve the state of a distributed application and to properly recover from component or overall system failure.

Figure 3D:
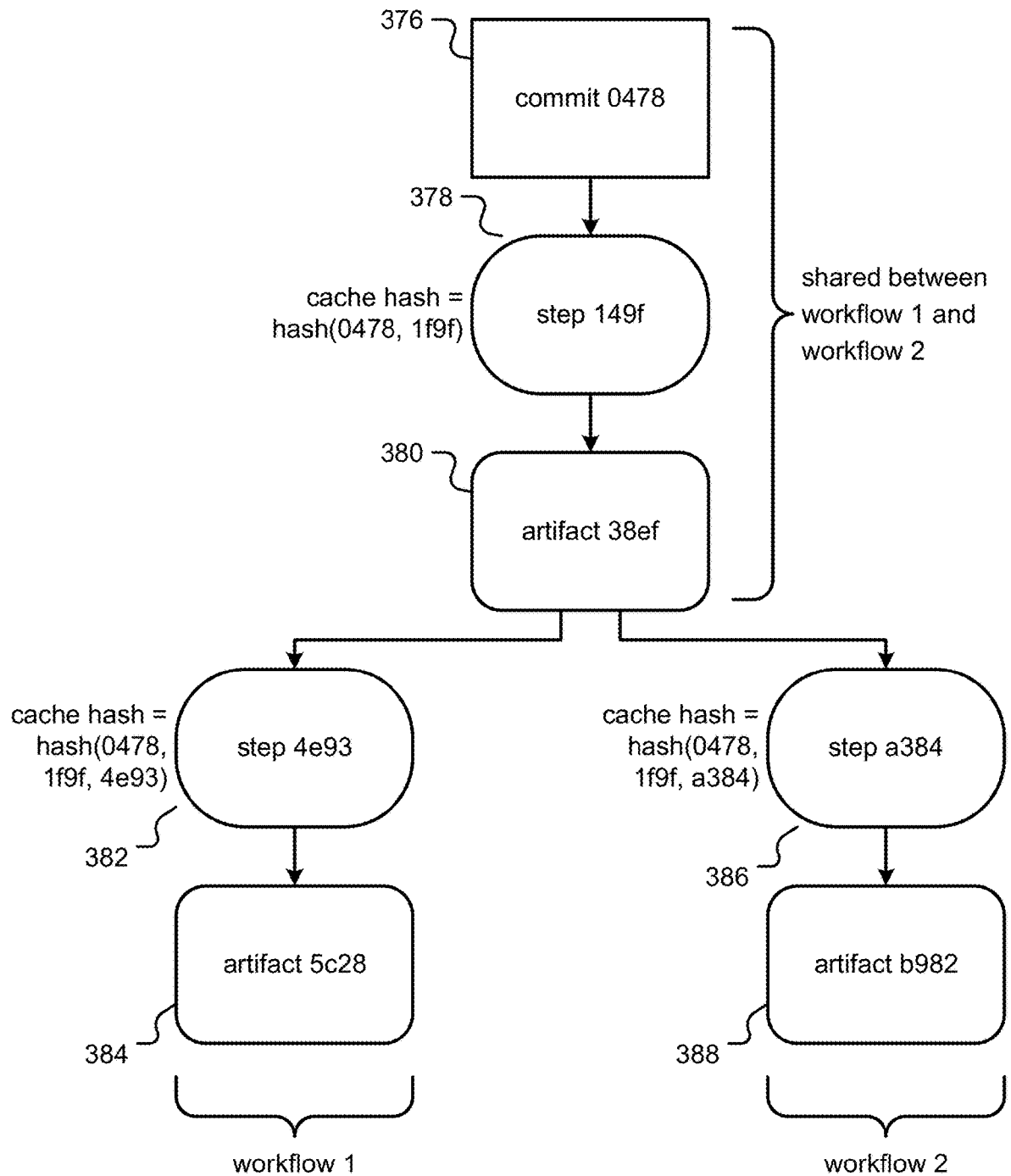
FIG. 3D is an illustration of two workflows that share the same initial steps.

FIG. 3D is an illustration of two workflows that share the same initial steps. This illustration demonstrates caching and reusing the result of previous work. There are cases where the same work may be repeated, such as: two workflows may share steps; a user may inadvertently run the same workflow more than once; different users may run the same workflow on the same data; and/or a user may try to rerun a workflow that previously failed in case the failure was transient.

In such a case, it may be beneficial to cache the results, including artifacts, of performing the work and reuse it in subsequent invocations. In FIG. 3D, data are represented by rectangular nodes (376, 380, 384, 388) and steps are represented by circular nodes (378, 382, 386). Each item of data and each step in a workflow may be identified by a content-based hash.

Data with the same and/or similar (e.g. same except with a different datestamp/timestamp) content will have the same hash. Steps that perform the same operation will also have the same hash. The results at each point in the workflow may be identified by a "cache hash", which is a function of the hash of the input data and the hashes of the steps that have been performed up to that point. Note that the hashes of intermediate artifacts are not needed to generate the cache hash.

In order to reuse the results of previous work, subsequent work may perform the same sequence of steps on the same input data. For DevOps workflows, the input data may be source code, which is organized as commits. In various embodiments, two commits are considered to be the same if their contents are identical. A commit may be identified using a UUID that uniquely identifies the content of the commit. A hash generated from the content of the commit is one way to reliably identify the contents of the commit. Many source control systems use content-based hashes to identify commits.

In one embodiment, the input data may be artifacts generated by previous workflows rather than commits. Two artifacts are considered the same/similar if they start from the same commit and apply the same sequence of workflows or steps to generate the artifact. In some cases, the contents of an artifact may also be identified using a UUID that uniquely identifies the content of the artifact. A hash generated from the content of the artifact is a common way to reliably generate such IDs.

In one embodiment, two steps are considered the same (also termed "similar") if the canonical representation of the workflows or steps are identical. For the purposes of this comparison, differences in the value of certain parameters or the performance of certain operations which are known to have no significant effect on the content of a generated artifact may be ignored. Examples of such parameters are sequence numbers or timestamps that indicate when the workflow or step was run.

As with artifacts, a hash of the canonical representation of a workflow or step may be used as a unique identifier. Similarly, a hash may be computed on the sequence of hashes or unique identifiers denoting the commit and steps applied in generating the final artifact. In one embodiment, the hash of an artifact may also be used instead of, or in addition to, the hash of the commit for determining a hash for the generated artifact.

For caching purposes, the result from a previous workflow may be substituted in the current workflow if the cache-hash computed up to a certain point in the workflow is identical to the cache-hash for a sequence of steps in the current workflow. The cache-hash may be computed by hashing the content hash of the input data along with the hashes for the sequence of steps performed in the workflow. For sequential steps, the order in which the hashes are used is important. For parallel steps, the ordering may not be important, and the hashes should be organized into a canonical order before computing the cache hash.

Figure 3E:
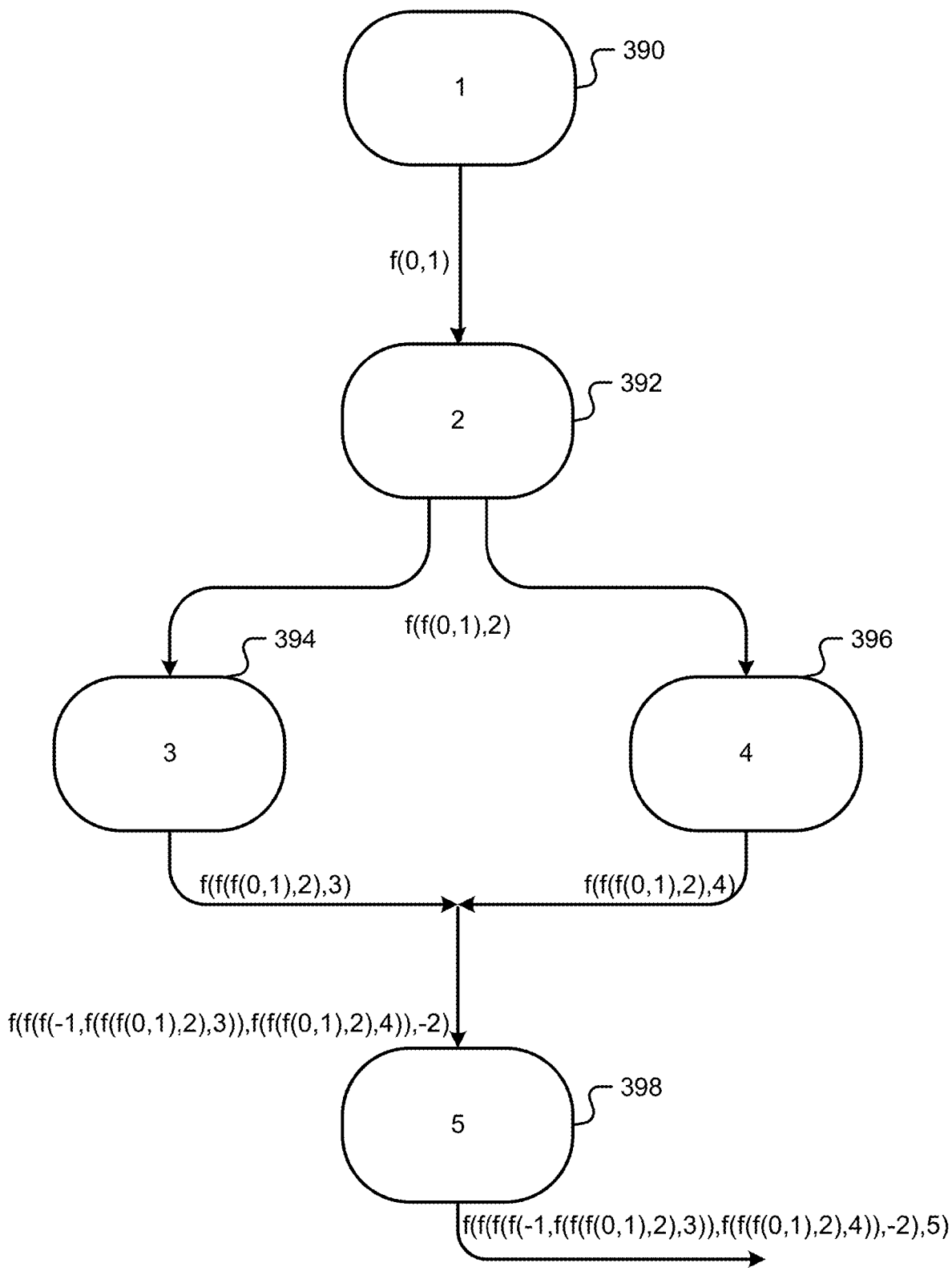
FIG. 3E is an illustration showing a canonical order for parallel steps for computing a hash.

FIG. 3E is an illustration showing a canonical order for parallel steps for computing a hash. In FIG. 3E, each step (390, 392, 394, 396, 398) has an associated hash at its output. After parallel steps (394) and (396), it is assumed that $f(f(f(0,1),2),3) < f(f(f(0,1),2),4)$ so that step (394) is used first in computing the cache-hash when the steps are joined together.

As shown in FIG. 3E, a workflow may be represented as a DAG (Directed Acylic Graph). In one embodiment, the cache-hashes are computed top-down by starting with the nodes without input edges. These may generally be the data inputs. For each subsequent step, whether sequential or parallel, a cache-hash is computed for the step by using a non-commutative hash function to hash the cache-hash of the previous step with the hash of the current step.

Note that for parallel steps, the cache-hash is independently computed for each parallel step. When the parallel steps join together, the independent hashes are combined by ordering the hashes into a canonical order, for example sorting the hashes, and then computing a "parallel hash" over the cache-hashes for the joined steps. Note that such a parallel hash is computed such that it is different from the hashes of the same steps computed in sequence. This may be done by adding distinctive begin and end markers when hashing the parallel steps. The joined hash that is computed is then used as the previous cache-hash for computing the cache-hash of subsequent steps.

Service Templates.

In traditional computing systems, computation is performed by applications that run on computing nodes. The applications perform arbitrary TO, including reading and writing to storage and sending and receiving messages. In some cases, the data generated by one application is consumed by another. The infrastructure assumes little about the structure of the computation being performed and the nature of the communication between the applications. As a result, correct and efficient execution of the applications requires persisting each and every IO operation that is performed or complex application level code to recover from failures.

This typically means that each data write performed by an application is persisted and accessible to any other application that performs a subsequent read. This imposes a high level of synchronization overhead on the infrastructure. These synchronization and persistence requirements as well as the need to share data generate between applications while trying to provide a simple management model for operators of the system typically require using a shared network storage system such as a SAN or NAS that may handle a very high volume of synchronized reads and writes. This all is expensive, inefficient and difficult to scale.

In one embodiment, service and workflow templates may be used to expose the specific storage, communication, performance, security, and other needs of each workflow and steps in the workflow. For example, one step in a workflow may need to communicate only with the subsequent step in the same workflow. In some cases, all needs are known before the workflow begins to execute and in other cases, some of the needs may be discovered during the execution of the workflow.

This knowledge allows the system (212) to make better resource allocation decisions and to use cheaper, faster resources where possible. For example, if the output of one step is consumed only by the following step, then running both steps on the same computing node will allow storing the output on storage local to the node. Another example, if it is known that two parallel steps in a workflow communicate heavily with each other, they may be scheduled on the same node or "nearby" nodes to optimize communication performance and overheads.

In one embodiment, each step in a workflow may be described by a "service template". A service template specifies parameters that are passed in and out when the service template is invoked as a step in a workflow, artifacts that are consumed and generated, communication channels that are used to communicate with other steps, and any external resources that are accessed or modified if any.

The formal parameters specified in the service template allow users to determine how to invoke the service template as a step in a workflow. The actual parameters passed in allows the service (212) to determine if two invocations of a service template are "equivalent": that is, whether they can be expected to generate the same results. This allows the service (212) to cache the result of previous invocations. For example, a build service template that is invoked with the same COMMIT_ID and VARIANT to be built, could be expected to produce essentially the same build results on each invocation.

Some parameters may affect performance or annotations but have no significant effect on the generated results. Differences in such parameters may be ignored, if desired, for caching purposes. Conversely, some invocations may always generate/collect new data or cause side effects and may never be cached.

In one embodiment, a service template may specify artifacts that are generated or consumed by an invocation of the service template. Users may specify requirements for the storage such as performance, capacity, reliability, and so forth. A service template may specify communication channels that are used by an invocation of the service template. Users may specify requirements for the channels including latency, bandwidth, reliability, and so forth.

A workflow is a type of service template that allows sequential and parallel composition of steps which are themselves specified as service templates. Workflow and service templates may be arbitrarily nested to create complex workflows. A service template may autoscale the steps that compose it to create an elastic service that may be invoked as a sequential step in a higher level workflow.

The execution of a service template may be performed in many ways including but not limited to a long running VM running a server application, a container that is dynamically created, or serverless computing technologies such as AWS Lambda or Google Cloud Functions.

System to Distribute and Execute Distributed Applications.

Figure 4A:
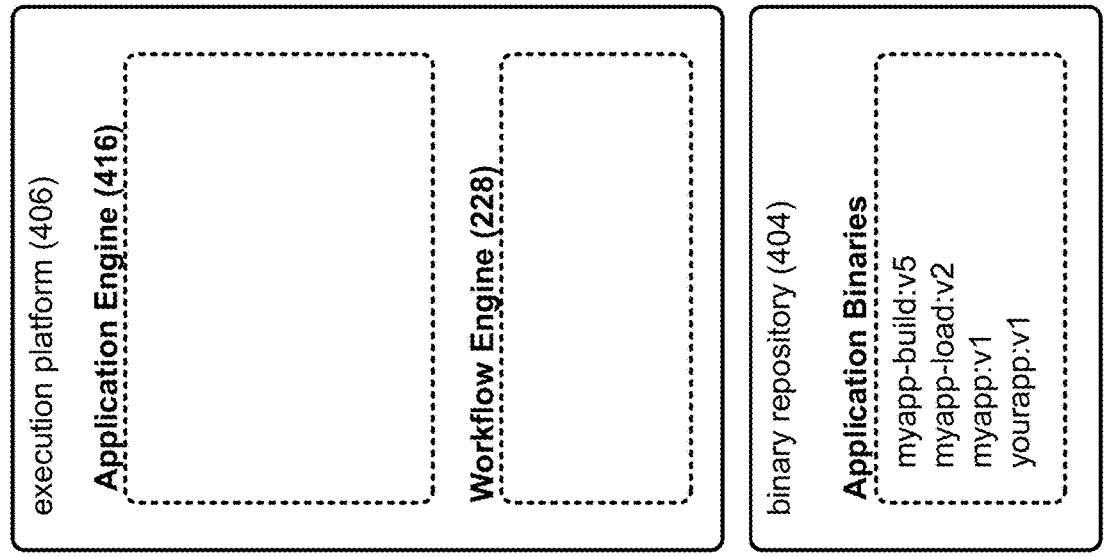
FIG. 4A is an embodiment of a system that allows flexible packaging, distribution and reliable, consistent execution of distributed and/or complex applications.
Figure 4A:
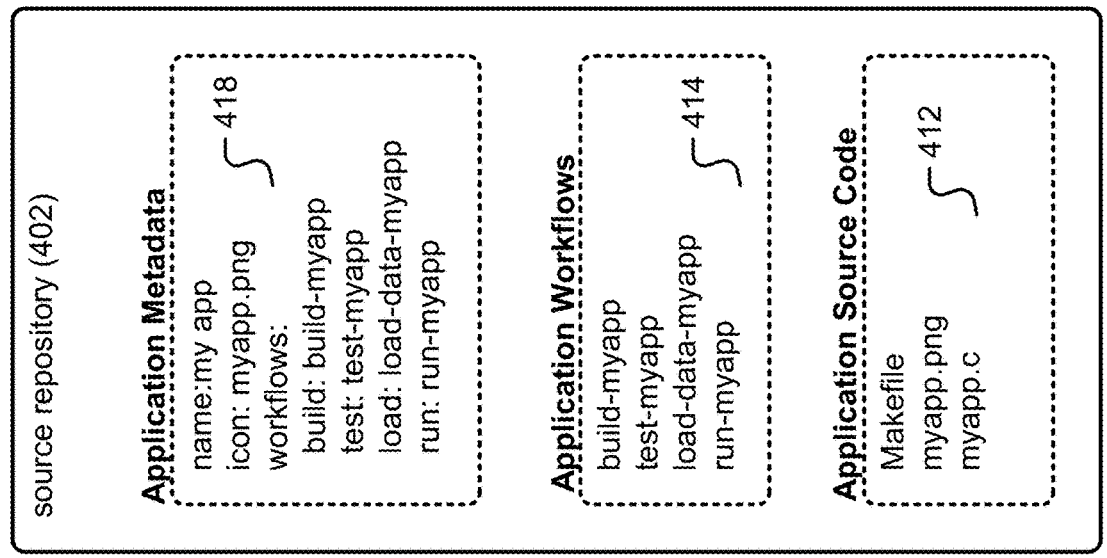

FIG. 4A is an embodiment of a system that allows flexible packaging, distribution and reliable, consistent execution of distributed and/or complex applications. Such an application may comprise multiple executable components and may require auxiliary workflows for effective use and management of the application.

The system includes a source repo (402), a binary repo (404), and an execution platform (406). Typically, a source code management system such as git may be used for the source repo (402) and an artifact management system such as Nexus as the binary repo (404). The execution platform (406) combines an engine for running workflows (228), an engine for running application objects (416), and a configuration database (224) to manage the application metadata and other state associated with the application.

The source repo (402) stores source code (412) for building binary objects such as executables, images, or other types of derived objects, some of which may be textual in nature such as "Makefile" and "myapp.c". In some cases, the source repo (402) may also store non-source objects such as images like "myapp.png" or executables.

The binary repo (404) stores binary objects including derived objects. A derived object is an object derived from another object, often source code but sometimes other derived objects, by the application of an algorithm, computer program or other process. A derived object may itself be source code, often machine generated. An example of a derived object is "myapp-build:v5" in binary repo (404). The source repo (402) and binary repo (404) may be implemented using existing standard packaging technologies and distribution channels.

The execution platform (406) is a machine for running workflows and executable objects stored in the binary repo (404) based on application metadata (414) and other application state. The execution platform includes a workflow engine (228), an application engine (416), and a configuration database (224).

The execution platform (406) abstracts infrastructure and environmental dependencies, allowing the creation of highly abstract and portable workflows. In the example system, the execution platform (406) distinguishes between two types of executable objects: workflows and applications. A workflow is a source object (414) based on an high-level programming language such as YAML that may be run by the execution platform (228).

An application is generally a non-source object that may be run by the execution platform (406). Examples of non-source objects include executables compiled from source code. Workflows may be run or triggered in many ways including manual user action, programmatically by other workflows or applications, based on time for example with a citron job, or events both internally or externally generated.

In one embodiment, the source repo contains three main types of objects: application metadata (418), workflows (414) and source code (412). In the example system, the application metadata (418) references workflows, the workflows (414) contain directions for building the application from source code (412), storing the resulting executable objects in the binary repo (404), and deploying the application.

These actions may be performed by the execution platform (406) based on the application metadata (418), workflows (414) and source code (412) stored in the source repo (402). Additional instructions and configuration information may also be stored in a separate configuration database. The application itself may be a distributed application consisting of multiple executable objects that coordinate and communicate with each other.

The application metadata (418) defines a set of standard actions or object-oriented interface for interacting with the application. The set of standard actions may be directly presented to the user as an easily accessible menu of available actions or be used by other programs to automate use and management of the application. These standard actions may be mapped to user defined workflows.

Some actions may be specific to a particular application while others may be common across a class of similar applications. The latter may define an interface that other programs can use to programmatically access the application. One of the strengths of workflows is that they provide a high-level language that is easier to use than lower-level languages and provide flexible, powerful coordination of the tasks for managing complex applications.

The creation of an integrated system that combines packaging and distribution of application metadata, workflows, source code, and binary objects with an execution platform that may execute the workflows as well as run the applications allows the creation of portable complex applications that may be run and managed on any instance of such an integrated system. By contrast, traditionally this was not possible due to a wide range of issues including reliance on ad-hoc installation and management scripts that must be customized for each environment.

Virtualization, for example containerization, provides good encapsulation and portability of simple stand-alone application that may run in a single server. Complex applications such as distributed applications and applications that require access to external services may be difficult to configure and maintain. Traditionally scripting is used to help automate this process, but scripts must often deal with complex infrastructure and environmental variations and do not properly support the full set of required life-cycle management operations such as monitoring, upgrades, loading data, deprovisioning and so on in a consistent, reliable manner. Complex applications thus require workflows for installation, configuration and continued management.

In one embodiment, an execution platform (406) provides abstraction of the underlying infrastructure and integration of workflows (414) with the execution platform (406) enables specification of infrastructure independent workflows that may be packaged with the execution objects and application metadata. Together, they enable the creation, distribution and execution of portable complex applications. The packaged application may then be run consistently and reliably on the execution platform (406) specifically designed for this purpose.

Figure 4B:
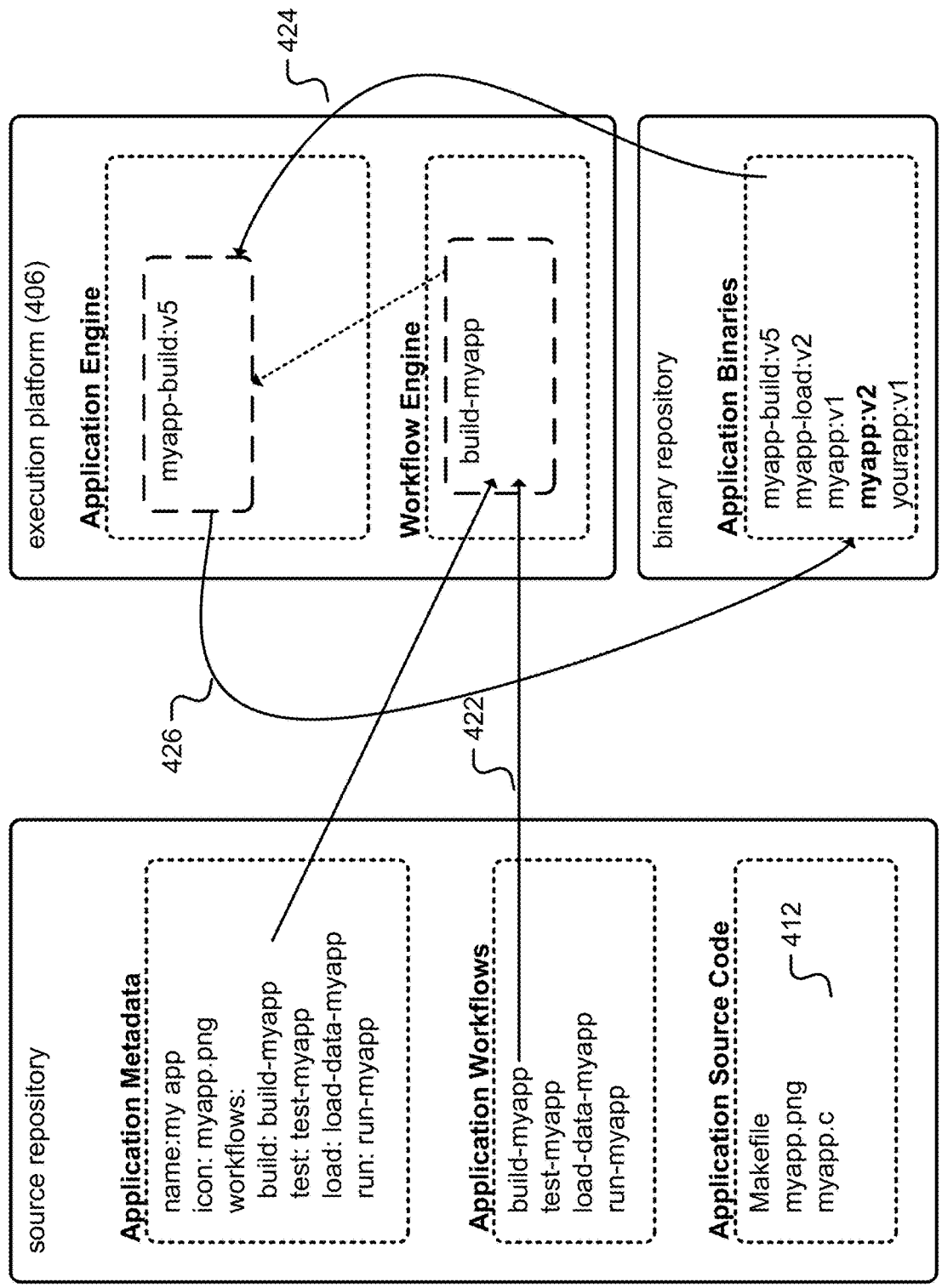
FIG. 4B is an illustration of building an application.

FIG. 4B is an illustration of building an application. To build the distributed application, the execution platform (406) runs the build-myapp workflow (422), which causes the execution platform (406) to run the myapp-build:v5 executable (424), which builds the source code (412) and generates the myapp:v2 executable (426), and stores the executable (426) in the binary repo (404).

Figure 4C:
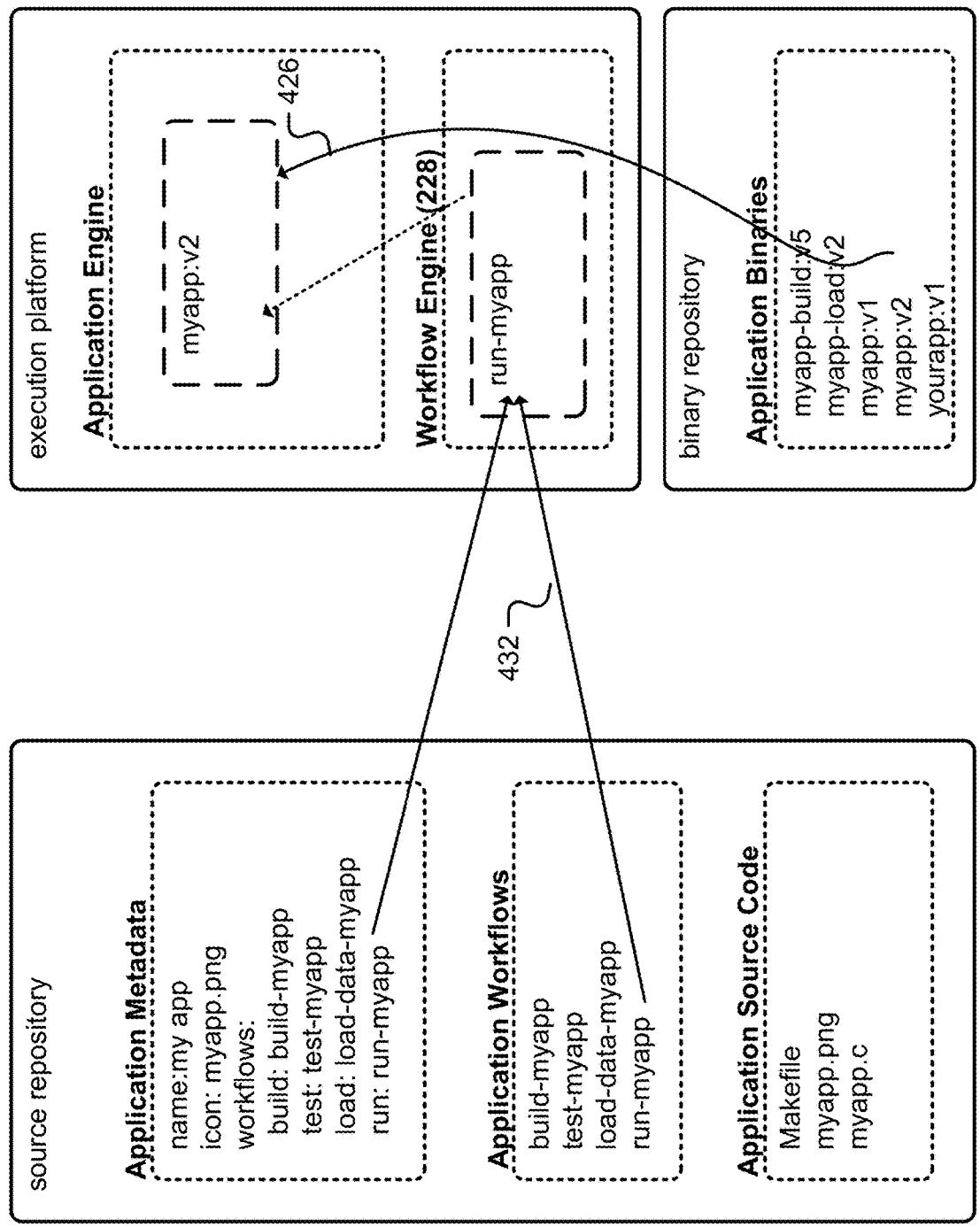
FIG. 4C is an illustration of running an application.

FIG. 4C is an illustration of running an application. To run the application, the workflow engine (228) runs the run-myapp workflow (432), which causes the execution platform to run the myapp:v2 executable (426). In some cases, the run workflow may run many executables in complex sequences and start up multiple sub-applications that together compose the desired complex application.

Figure 4D:
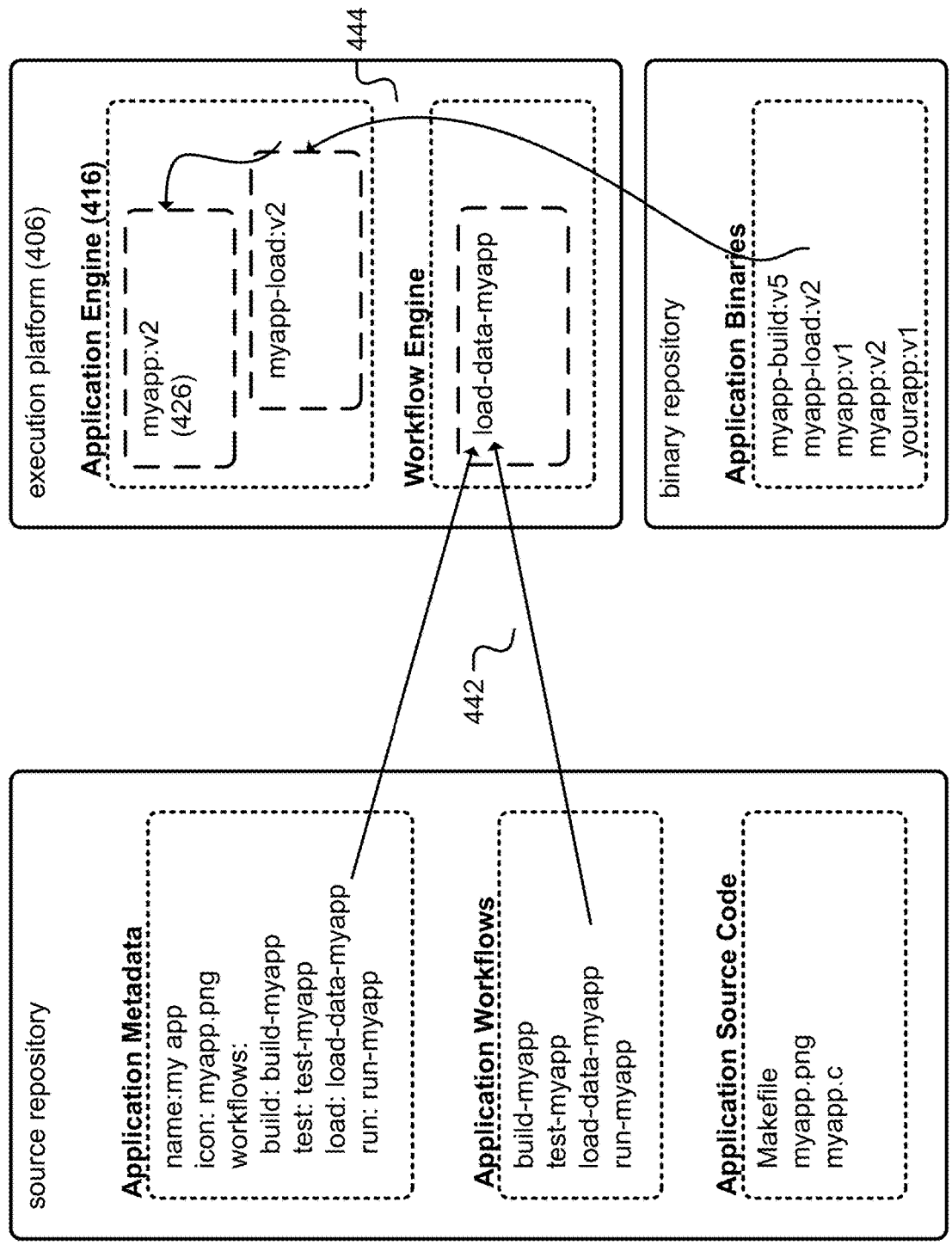
FIG. 4D is an illustration of modifying a running application.

FIG. 4D is an illustration of modifying a running application. To load data into the running application, the application engine (416) runs the load-data-myapp workflow (442), which causes the execution platform (406) to run the myapp-load:v2 (444) executable object, which causes the data to be loaded into the myapp:v2 application (426).

Specifying, Visualizing and Interacting with Distributed State Machines Using Workflows.

A distributed state machine is an abstraction for designing and building distributed applications. Because the state of such applications span multiple application components and nodes, designing such systems to automatically tolerate and recover from failures and run efficiently on multi-node systems may be challenging. Understanding what happens in such systems and debugging, configuring and tuning such systems may also be challenging. Most humans are naturally better at thinking in terms of sequential workflows than parallel state transitions in distributed state machines.

Each workflow specifies a sequence of steps to be performed to accomplish a specific task. Some steps in the workflow may be executed in parallel, but the overall structure of the workflow may be viewed as a sequence of steps. Each workflow is viewed as specifying a subset of state transitions in a large distributed state machine. The collection of all workflows supported by a system completely specifies/implements the state transitions in the distributed state machine.

An advantage of using workflows to build distributed state machines is that because each workflow consists of a sequence of steps and corresponds to a task that a user is familiar with, they are much easier to understand than state transitions in a large distributed state machine. By caching the results of individual steps, it may be possible for the system to automatically refactor workflows to efficiently execute the entire set of potentially overlapping workflows/state machine transitions. This gives users the appearance that each workflow executes in isolation, making the given workflow they are interested in easier to visualize, tune, and debug.

Workflows typically consist of a sequence of steps. Each workflow and step in a workflow is associated with the name of a service template which is meaningful to the user. Workflows may be hierarchically composed into larger workflows. As a result, workflows provide a linear context for visualizing and tuning significant transitions in a distributed state machine.

Important metrics such as cost and run time may be automatically collected for each step in the workflow and in the context of each workflow. This results in knowing not only the average cost of executing a service template, but the average cost of executing the service template in the context of a specific workflow. These costs are additive and hierarchical composition of workflows results in a linear model that may be easy to understand and optimize.

Being able to hierarchically view and optimize such a model, the components of which have already been labeled with names meaningful to the user, is an advantage of the service (212). This type of contextual information and modeling capability is valuable in subsequently optimizing the performance of the system, particularly when the performance or other execution characteristics of a step is dependent on the context of the workflow in which it executes.

Users may extend the state machine by creating custom workflows that use either newly created custom steps or existing steps and workflows. The new workflows may not disrupt existing workflows. The new and existing workflows may share cached artifacts generated by common steps and state transitions. Once the new steps and workflows are created, other users may also use them.

Tracking Derived Objects. Derived objects may be generated by workflows. For each derived object, the combination of input data, workflows and parameters that were used to generate the derived object are tracked. As a result, any derived object, even those generated interactively or on-demand, may be regenerated. This is particularly useful if some of the input data, code or workflows have changed and a user wishes to generate and/or synthesize a new version of these derived objects that reflect the changes.

Figure 5:
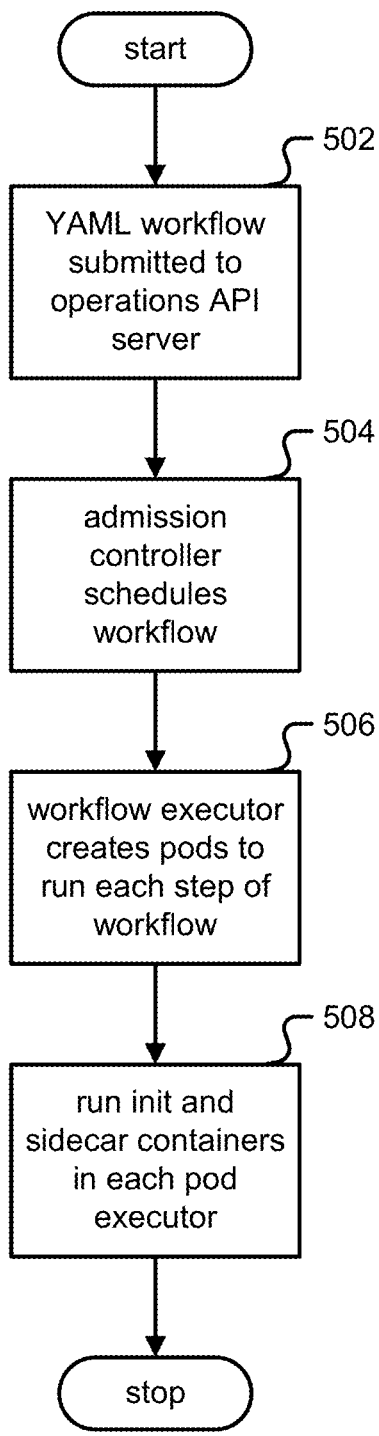
FIG. 5 is a flow chart illustrating an embodiment of a process for running a workflow.

FIG. 5 is a flow chart illustrating an embodiment of a process for running a workflow. In one embodiment, the process of FIG. 5 is carried out by application management service (212) for FIG. 2B.

In step 502, a workflow definition in YAML is submitted to the operations API server (226). In one embodiment, a parameter substitution is performed to create a fully expanded document, for example in JSON. A "cache hash" is computed for each intermediate step in the workflow as described above and in FIG. 3D and FIG. 3E. The system looks up the hash in the CMDB (224), and in the event the hash matches a previously executed sequence of steps, the steps leading up to the matching hash are annotated as "cached" and may be skipped during the execution of the workflow. The results from the previous execution of the steps may be used as input to any subsequent steps.

In step 504, the expanded and annotated document is submitted to the admission controller (222). The admission controller (222) schedules the workflow, in part deciding which job to admit and waiting for minimal resources such as CPU and/or memory needed to run the workflow. The admission controller also creates an workflow executor (228) pod to run the workflow, and monitors its created workflow executor (228).

In step 506, the workflow executor (228) in turn creates pods via the platform API server (244) to run each step in the workflow. The workflow executor (228) processes a graph describing the complete set of sequential and parallel steps that generally should be executed for a workflow. The workflow executor (228) creates pods to execute any step that is currently executable, that is its predecessor steps have completed. Thus, a workflow with many parallel steps may have many pods running at the same time. The workflow executor (228) may create pods for dynamic fixtures if any are specified. The workflow executor (228) may reserve static fixtures if any are specified. The workflow executor (228) may schedule deployments if any are specified. The workflow executor (228) may restart steps interrupted by failure such as a node/minion restart.

In step 508, each pod executor (250) in a workflow step executes init and sidecar containers for initialization, performs log management, performs artifact management, performs reporting and initiates cleanup.

Figure 6:
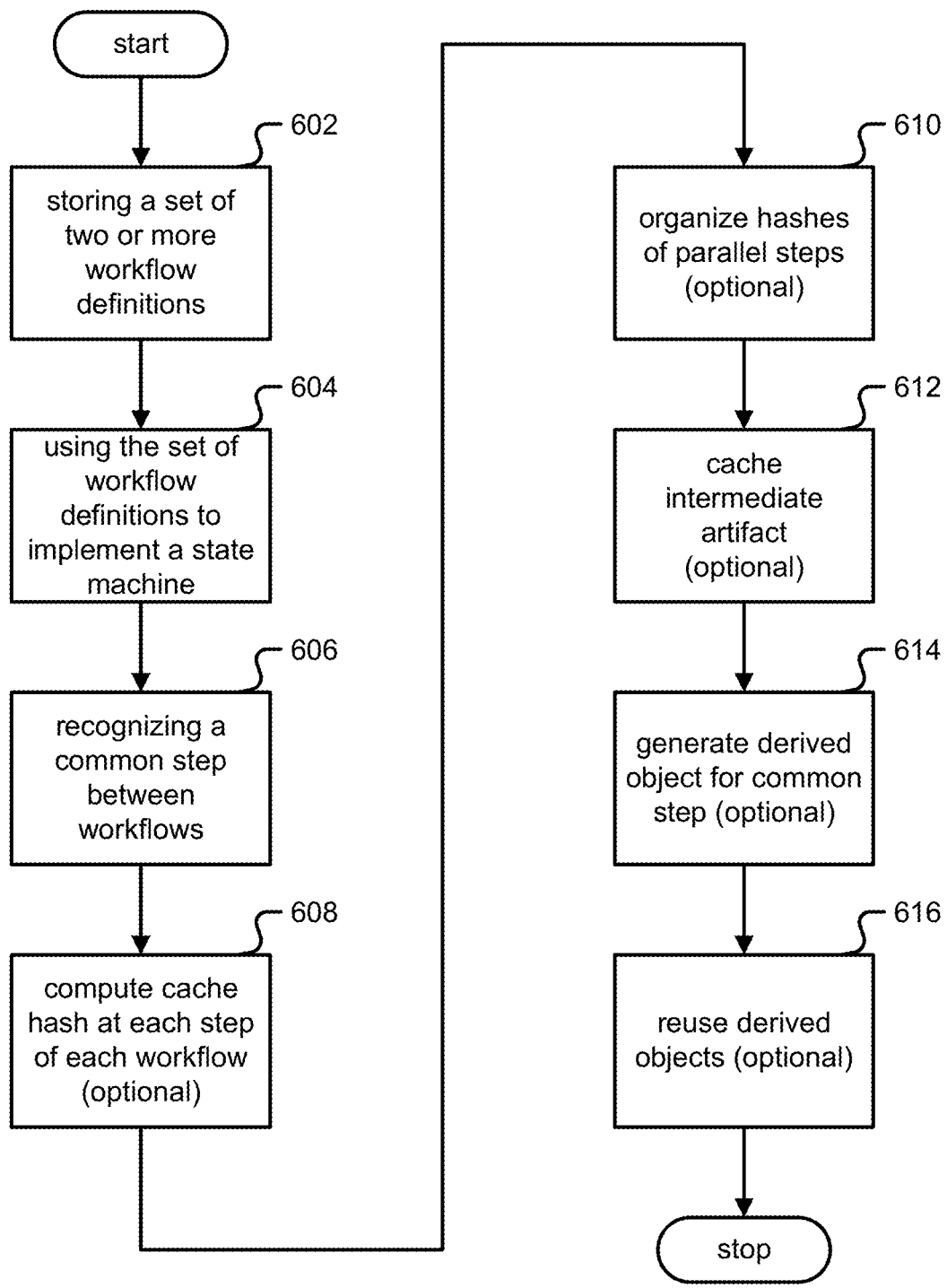
FIG. 6 is a flow chart illustrating an embodiment of a process for using workflow definitions to implement a state machine of an application.

FIG. 6 is a flow chart illustrating an embodiment of a process for using workflow definitions to implement a state machine of an application. In one embodiment, the process of FIG. 6 is carried out by the system of FIG. 2B. The capitalized term "STEP" is used to indicate a step in the flow chart of FIG. 6 to differentiate it from a step in any associated workflow.

In STEP 602 a set of two or more workflow definitions, each workflow definition describing a workflow of an application is stored, for example via operations API server (226).

In STEP 604, the set of two or more workflow definitions are used to implement a state machine of the application based at least in part on the two or more workflow definitions, for example a state machine such as that shown in FIG. 3C.

In one embodiment, implementing the state machine comprises a STEP 606 of recognizing a common step between at least two of the set of two or more workflow definitions based at least in part on the two or more workflow definitions. In one embodiment, the application is a distributed application and distributed across two or more containers. In one embodiment, each workflow definition is expressed in a stylized and/or restricted language, such as a declarative language, for example a domain specific language (DSL), including at least one of the following: YAML, XML.

In one embodiment, each workflow definition defines steps comprising an associated workflow, wherein a given step may be sequential or parallel.

In one embodiment, STEP 606 of recognizing the common step is based at least in part on recognizing a common template with common inputs within the at least two of the set of two or more workflow definitions. In one embodiment, STEP 606 of recognizing the common step is based at least in part on recognizing common output via two or more steps in response to common input within the at least two of the set of two or more workflow definitions. In one embodiment, STEP 606 of recognizing the common step is based at least in part on by ignoring parameters not relevant to commonality including timestamps and/or datestamps.

In one embodiment, STEP 606 of recognizing the common step is based at least in part on a fingerprint and/or hash for each point in a given workflow. In one embodiment, STEP 606 of recognizing the common step is based at least in part on a hash for each point in a given workflow, wherein the hash comprises a first hash of a content and a second hash of an operation. In one embodiment, STEP 606 of recognizing the common step is based at least in part on a hash for each point in a given workflow, wherein the hash comprises a first hash of input data for the common step and a second hash based on the common step. In one embodiment, STEP 606 of recognizing the common step is based at least in part on a hash of a container.

An optional STEP 608 is to compute a cache hash at each step in a workflow. An optional STEP 610 is to organize hashes of a set of parallel steps in the workflow in a canonical order before being the hashes of the set of parallel steps are hashed together as shown in FIG. 3E. An optional STEP 612 is to cache an intermediate artifact produced by an instance of the workflow, wherein the intermediate artifact comprises a result of the common step of STEP 606. In one embodiment, the intermediate artifact is reused for a subsequent workflow that shares the common step.

An optional STEP 614 is to track input data, the workflow, and parameters used to generate a derived object for the common step. An optional STEP 616 is to reuse the derived objects for a subsequent workflow that shares the common step. In one embodiment, a synthesized derived object is generated by changing the tracked input data.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a memory configured to store a set of two or more workflow definitions, each workflow definition describing a workflow of an application; and
    a processor coupled to the memory and configured to use the set of two or more workflow definitions to implement a state machine of the application based at least in part on the set of the two or more workflow definitions.

2. The system of claim 1, wherein implementing the state machine comprises recognize a common step between at least two of the set of two or more workflow definitions based at least in part on the two or more workflow definitions.

3. The system of claim 2, wherein the application is a distributed application and distributed across two or more containers.

4. The system of claim 2, wherein each workflow definition is expressed in a stylized and/or restricted language.

5. The system of claim 2, wherein each workflow definition is expressed in a declarative language.

6. The system of claim 2, wherein each workflow definition is expressed in a domain specific language (DSL), including at least one of the following: YAML, XML.

7. The system of claim 2, wherein each workflow definition defines steps comprising an associated workflow, wherein a given step may be sequential or parallel.

8. The system of claim 2, wherein recognizing the common step is based at least in part on recognizing a common template with common inputs within the at least two of the set of two or more workflow definitions.

9. The system of claim 2, wherein recognizing the common step is based at least in part on recognizing common output via two or more steps in response to common input within the at least two of the set of two or more workflow definitions.

10. The system of claim 2, wherein recognizing the common step is based at least in part on by ignoring parameters not relevant to commonality including timestamps and/or datestamps.

11. The system of claim 2, wherein recognizing the common step is based at least in part on a fingerprint and/or hash for each point in a given workflow.

12. The system of claim 2, wherein recognizing the common step is based at least in part on a hash for each point in a given workflow, wherein the hash comprises a first hash of a content and a second hash of an operation.

13. The system of claim 2, wherein recognizing the common step is based at least in part on a hash for each point in a given workflow, wherein the hash comprises a first hash of input data for the common step and a second hash based on the common step.

14. The system of claim 2, wherein recognizing the common step is based at least in part on a hash of a container.

15. The system of claim 2, wherein the processor is further configured to compute a cache hash at each step in each workflow.

16. The system of claim 2, wherein the processor is further configured to organize hashes of a set of parallel steps in each workflow in a canonical order before being the hashes of the set of parallel steps are hashed together.

17. The system of claim 2, wherein the processor is further configured to cache an intermediate artifact produced by an instance of each workflow, wherein the intermediate artifact comprises a result of the common step.

18. The system of claim 17, wherein the processor is further configured to reuse the intermediate artifact for a subsequent workflow that shares the common step.

19. The system of claim 2, wherein the processor is further configured to track input data, the workflow, and parameters used to generate a derived object for the common step.

20. The system of claim 19, wherein the processor is further configured to reuse the derived object for a subsequent workflow that shares the common step.

21. The system of claim 20, wherein the processor is further configured to generate a synthesized derived object by changing the tracked input data.

22. A method, comprising
storing a set of two or more workflow definitions, each workflow definition describing a workflow of an application; and
using the set of two or more workflow definitions to implement a state machine of the application based at least in part on the two or more workflow definitions.

23. A computer program product, the computer program product being embodied in a tangible computer readable storage medium and comprising computer instructions for:
storing a set of two or more workflow definitions, each workflow definition describing a workflow of an application; and
using the set of two or more workflow definitions to implement a state machine of the application based at least in part on the two or more workflow definitions.

* * * * *